(12) United States Patent
Schwartz et al.

(10) Patent No.: US 6,195,466 B1
(45) Date of Patent: Feb. 27, 2001

(54) REVERSIBLE DCT FOR LOSSLESS-LOSSY COMPRESSION

(75) Inventors: Edward L. Schwartz, Sunnyvale; Ahmad Zandi, Cupertino, both of CA (US)

(73) Assignees: Ricoh Company, Ltd., Tokyo (JP); Ricoh Corporation, Menlo Park, CA (US)

( * ) Notice: Subject to any disclaimer, the term of this patent is extended or adjusted under 35 U.S.C. 154(b) by 0 days.

(21) Appl. No.: 09/378,616

(22) Filed: Aug. 20, 1999

Related U.S. Application Data

(62) Division of application No. 08/846,352, filed on Apr. 30, 1997, now Pat. No. 6,058,215.

(51) Int. Cl.[7] .................. G06K 9/36; G06K 9/46
(52) U.S. Cl. .................................. 382/250; 382/244
(58) Field of Search ............................ 382/250, 276, 382/277, 244; 708/402

(56) References Cited

U.S. PATENT DOCUMENTS

| | | | | |
|---|---|---|---|---|
| 5,129,015 | * | 7/1992 | Allen et al. | 382/167 |
| 5,703,799 | * | 12/1997 | Ohta | 708/402 |
| 5,790,441 | * | 8/1998 | Oami et al. | 708/400 |

* cited by examiner

Primary Examiner—Phuoc Tran
(74) Attorney, Agent, or Firm—Blakely, Sokoloff, Taylor & Zafman LLP

(57) ABSTRACT

A reversible Discrete Cosine Transform (DCT) is described. The reversible DCT may be part of a compressor in a system. The system may include a decompressor with a reversible inverse DCT for lossless decompression or a legacy decompressor with an inverse DCT for lossy decompression.

2 Claims, 13 Drawing Sheets

$$D = \frac{0.37175}{0.60150} = \tan 0.1763\pi$$

$$E = \frac{1}{3} = \tan 0.1024\pi$$

REVERSIBLE DCT FOR LOSSLESS-LOSSY COMPRESSION

This application is a division of application Ser. No. 08/846,352 filed Apr. 30, 1997, now U.S. Pat. No. 6,058,215.

FIELD OF THE INVENTION

The present invention relates to the field of compression and decompression systems; more particularly, the present invention relates to lossless discrete cosine transform (DCT)-based compression which is reversible.

BACKGROUND OF THE INVENTION

The Discrete Cosine Transform (DCT) is an irrational transform commonly used in lossy image compression. The DCT is commonly used in lossy image compression. It is used in many modes of the JPEG standard and the MPEG standards and future HDTV in the United States. For a discussion on the various standards, see ISO Standard documents ISO/EEC 10918 (JPEG), 11172 (MPEG 1), 13818 (MPEG 2) and William B. Pennebaker and Joan L. Mitchell, "JPEG Still Image Data Compression Standard," 1993. The basis vectors of DCT have irrational values. Theoretically, integer inputs result in irrational transform coefficients. Therefore, infinite precision is required to perform those transforms exactly. For use in compression, transform coefficients must be rounded to a finite representation.

With most transform implementations, the rounding coefficients to integers does not guarantee that every unique integer input results in a different output. Therefore, the inverse DCT cannot reconstruct the input exactly. The error due to forward and inverse DCT transforms without quantization is referred to as systemic error. This systemic error prevents DCT implementations from being used in lossless compression without retaining a difference or error image.

In practical DCT implementations, the transform basis vectors are also rounded. The difference between a given implementation and the ideal transform (or a high accuracy floating point implementation) is referred to as mismatch. Low mismatch is required for data interchange. There can be a trade-off between the amount of mismatch and speed, cost and other desirable features.

A parameterized transform referred to herein as the Allen Parameterized Transform (APT) is a family of fast transforms which can implement the DCT or rational transforms that are arbitrarily close to the DCT. The APT is also referred to as a generalized Chen transform (GCT) For more information on the APT, see J. Allen, "Generalized Chen Transform: A Fast Transform for Image Compression," *Journal of Electronic Imaging*, Vol. 3(4), October 1994, pgs. 341–347; J. Allen, "An Approach to Fast Transform Coding in Software," *Signal Processing: Image Communication*, Vol. 8, pp. 3–11, 1996; and U.S. Pat. No. 5,129,015.

The present invention provides a reversible block based transform, such as, for example, a reversible DCT. The DCT of the present invention may be included in a DCT-based compressor/decompressor that may be used in a lossless compression/decompression system. The present invention also provides DCT transforms with no systemic error and no (or low) mismatch.

SUMMARY OF THE INVENTION

A reversible Discrete Cosine Transform (DCT) is described. The reversible DCT may be part of a compressor in a system. The system may include a decompressor with a reversible inverse DCT for lossless decompression or a legacy decompressor with an inverse DCT for lossy decompression.

In one embodiment, the compressor comprises a DCT compressor having a multiple rotations (e.g., 2 point (2×2) integer rotations), a 4 point parametrized transform, and a subsidiary matrix. The 4 point transform comprises a rotation by B, while the subsidiary matrix comprises a rotation by A and a rotation by C.

The present invention also provides a method for creating a look up table for rounding offsets for use in a reversible DCT.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
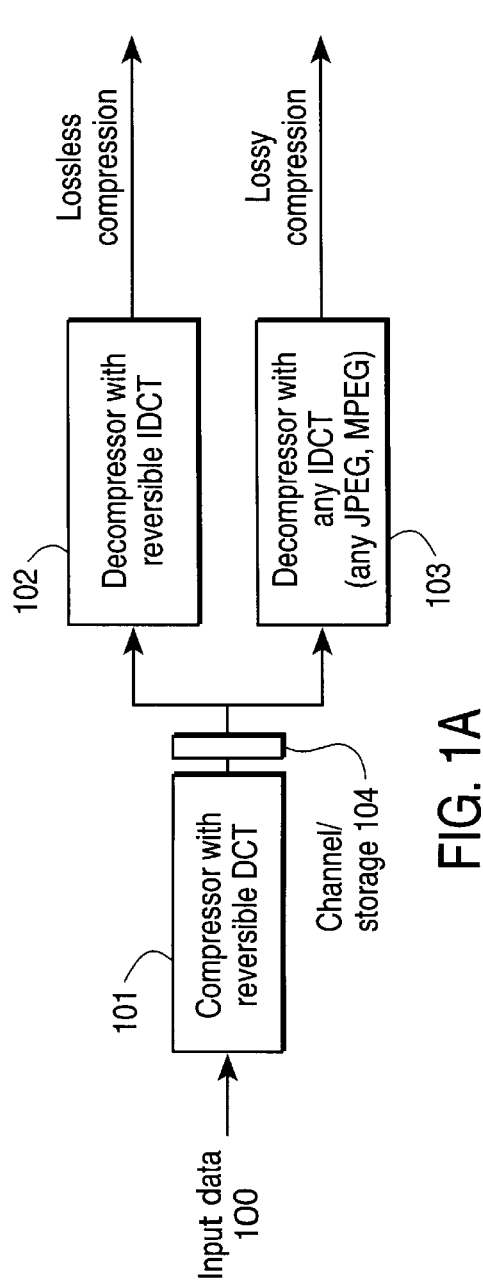
FIG. 1A is a block diagram of one embodiment of a lossless and lossy DCT based compression system.

A reversible DCT-based compression/decompression apparatus and method are described. In the following detailed description of the present invention numerous specific details are set forth, such as types of transforms, coefficient sizes, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Such computer systems typically employ one or more processors to process data, which are coupled to one or more memories via one or more buses.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnet or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview of the Present Invention

The present invention provides a reversible transform that allows DCT-based compression to be lossy and lossless. Reversible Transforms are efficient transforms implemented with integer arithmetic whose compressed results can be reconstructed into the original. One embodiment of the reversible transform is an extension of the APT.

The reversible transforms of the present invention are efficient (or almost efficient), in that there is no redundancy in the least significant bits of the coefficients. That is, the transforms of the present invention are efficient in that they do not require a large number of bits of precision (which would otherwise be used in an attempt to eliminate the systemic error. Efficiency leads to better lossless compression than using a non- reversible transform with a difference image. Several methods of constructing reversible APT implementations are described below. The reversible APT has many applications, such as in video authoring systems.

While transform coefficients may be rounded to any degree of precision, the present invention rounds transform coefficients to integers. Rounding more coarsely than to integers eliminates information and is a type of quantization. Rounding more finely than to integers introduces redundancy in the least significant bits of the transform coefficients, hindering compression.

The present invention provides DCT transforms with no systemic error. Because there is no systemic error, the transforms are reversible, or lossless, transforms. These reversible transforms can be used for lossless compression.

The present invention provides reversible DCT transforms which have low mismatch. Minimum quantization matrices are given for ±1 mismatch of quantized coefficients. If the minimum or greater quantization is used, the resulting coefficients can be used with any inverse DCT.

The present invention may be implemented in hardware of software, or a combination of both.

System Overview

The reversible DCT of the present invention may be used in lossless or lossy systems containing either a reversible inverse DCT to obtain exactly what was originally input or containing a prior art (not reversible) inverse DCT. A prior art DCT would be able to take the output of the reversible DCT because of its low enough mismatch with the true DCT to obtain exactly the same result as the normal DCT. In other words, a MPEG or JPEG decoder with a legacy DCT decoder may be used with the reversible DCT of the present invention.

FIG. 1 is a block diagram of one embodiment of a lossless and lossy DCT based compression system. Note that although the present invention is described at times in terms of a DCT-based system, the present invention is applicable to other block-based transforms. Referring to FIG. 1, input data 100 (e.g., an input image) is compressed with a reversible DCT based compressor 101 of the present invention. The input image 100 may be retrieved from a memory or received from a channel, both of which have not been shown to avoid obscuring the present invention. The input image may be generated by a camera, a digitizer, a scanner, a frame grabber, or other well-known or similarly functioning device. The results of the compression are a plurality of coefficients that may be output to a channel or to a storage device. Note that other types of compression may follow or precede the use of the DCT-based compressor.

For lossless decompression, a decompressor with a reversible inverse DCT (IDCT) 102 is used on unquantized coefficients to exactly reconstruct the original. For lossy decompression, transform coefficients are quantized and then may be decompressed with a decompressor using any inverse DCT (IDCT) 103. As discussed above, the lossy decompressor may be a legacy system such as a JPEG or MPEG compliant decoder.

In one embodiment, the DCT compressor receives pixel components into a DCT transform, the output of which undergoes zigzag ordering to produce frequency coefficients. Thereafter, the coefficients typically undergo lossless entropy coding. Similarly, in the inverse DCT compressor, frequency coefficients undergo lossless entropy encoding and then are input to a zigzag unordering block and thereafter to a DCT transform to retrieve the pixel components.

Compressor 101 is shown coupled to decompressors 102 and 103 through a channel or storage device 104. They may not be physically coupled together at all. That is, data may be compressed and stored using the compressor and an entirely separate decompression system may access the information, or copies thereof, to access the compressed information. In this manner, the channel or storage is transparent.

Figure 1B:
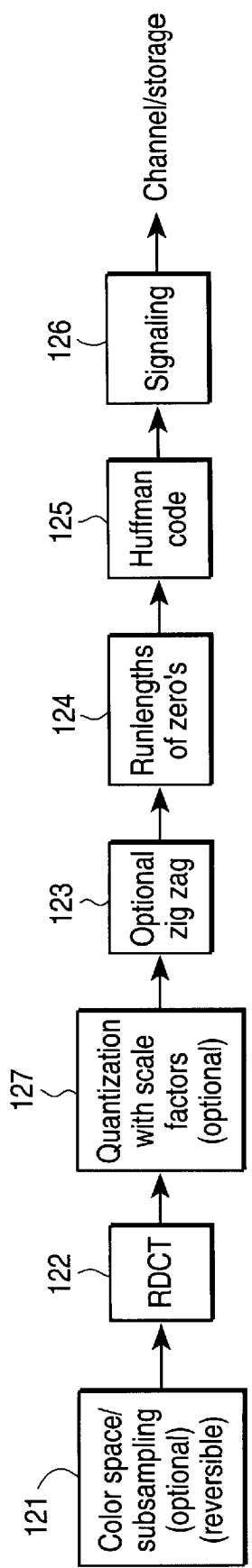
FIG. 1B is a block diagram of one embodiment of the compressor of the present invention.

FIG. 1B illustrates is a block diagram of one embodiment of the compressor of the present invention. Referring to FIG. 1B, the compressor includes color space or subsampling block 121 which performs color space conversion or subsampling of the input data. This is an optional block and may not be included in some compressors. In one embodiment, the color space performed by block 121 is reversible.

The output of color space/subsampling block 121 is coupled to reversible DCT 122. The transformed values output from reversible DCT 122 are coupled to the input of zigzag ordering block 123, which performs well-known zig-zag ordering techniques. It should be noted that this zigzag ordering block 123 is also optional. The output of zigzag ordering block 123 is coupled to run length block 124 which identifies run lengths of zeros. The output of run length block 124 is coupled to the input of Huffman coder 125, which performs Huffman coding. The output of the Huffman coding block is coupled to the input of signaling block 126 which sets forth the signaling for the decoder to indicate to the decoder what type of quantization or decoding options were taken to enable the decoder to effectively decode the encoded data. In one embodiment, signaling block 126 generates a header that precedes the compressed data and indicates to the decoder the information to enable decoding. Optionally, quantization with scale factors may be applied after the reversible DCT block 122 and prior to zigzag ordering block 123. Such quantization with scale factors is described in more detail below.

Figure 1C:
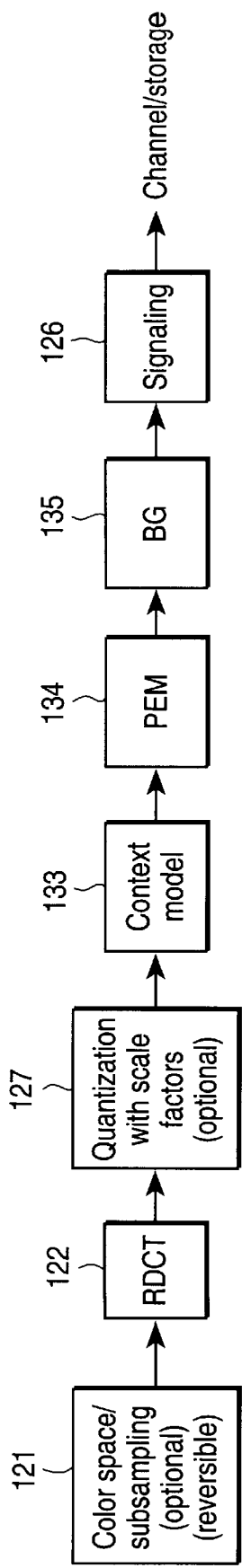
FIG. 1C is a block diagram of an alternate embodiment of the compressor of the present invention.

FIG. 1C is a block diagram of an alternate embodiment of the compressor of the present invention Referring to FIG. 1C, color space/subsampling block 121 is coupled to reversible DCT 122. The output of reversible DCT 122 is coupled to an optional, quantization with scale factors block 127. The output of the quantization with scale factors block 127 is coupled to the input of context model 133. Context model 133 produces the context for the data. These contexts are forwarded to the probability estimation machine (PEM) 134. The PEM 134 generates probability estimates for the data based on contexts received. These probability estimates are output to bit stream generator (BG) 135 which generates the output bit stream based on the context from context model 133 and the probability estimates from PEM 134. The output of bit stream generator 135 is coupled to signaling block 126.

Figure 2:
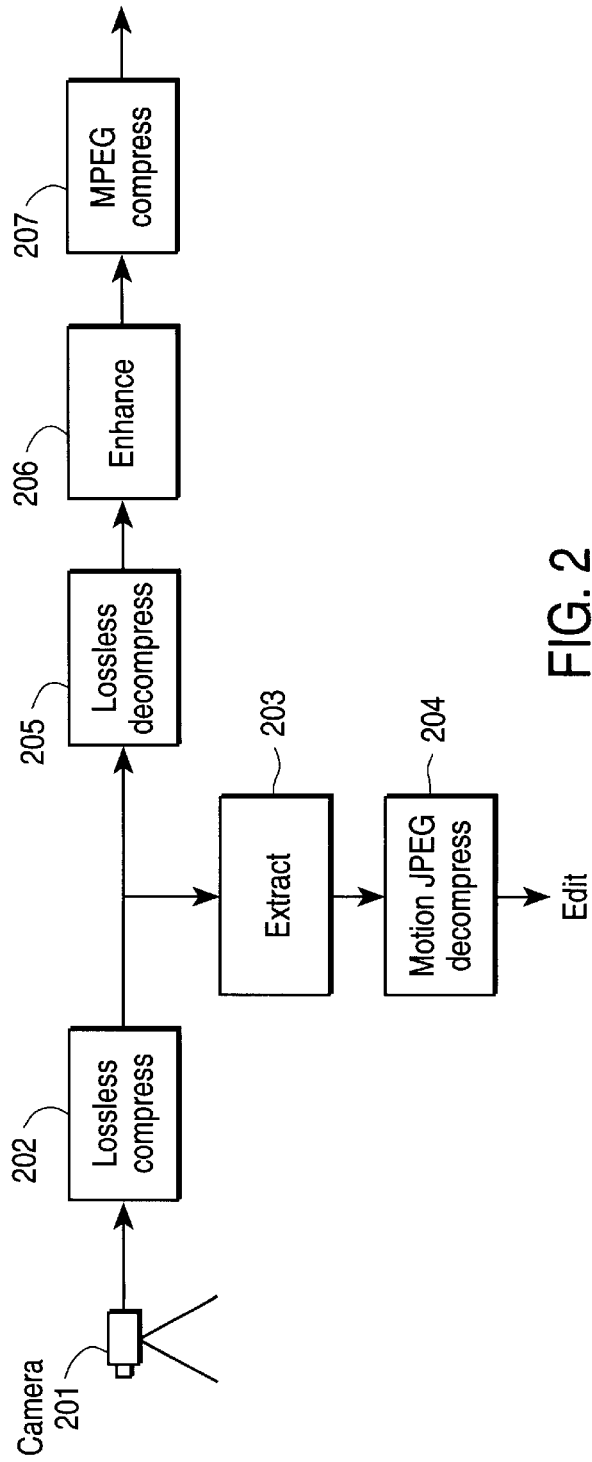
FIG. 2 is a block diagram of one embodiment of a video authoring system.

FIG. 2 is a block diagram of an example application of the present invention to a video authoring system. Referring to FIG. 2, one or more input devices, such as cameras 201, capture or obtain video images.

During capture, video is compressed losslessly by lossless compressor 202, which is coupled to camera(s) 201. In one embodiment, this allows approximately a factor of two savings in bandwidth and storage while not introducing any degradation. In other words, there are no artifacts. Although the eventual target compression ratio for video is typically 100:1 lossy compression, initial lossless compression preserves information for enhancement, digital effects and any frame to be a high quality I-frame (for video compression). I-frames are well-known in the art of video compression and are compressed like a still image according to such compression standards as MPEG and HDTV.

The output of compressor 202 is coupled to extraction block 203. For editing, quantized DCT coefficients can be extracted by extraction block 203, (transcoded if necessary) and fed to a motion JPEG decompressor 204 to which it is coupled. Extraction block 203 may operate by determining which frames are desired and/or selecting only a certain number of bits of each coefficient. For instance, Table 13 described below indicates the number of bits to discard, (in other words, which bits to keep). In another embodiment, extraction block 203 may only select some of the blocks, thereby clipping the image.

The motion JPEG decompressor 204 may be a low cost device or any legacy device. Because the compressed data is already in the DCT transform domain, the computation required to try different cuts and to experiment with different quantizations is reduced. Thus, this embodiment allows information to be viewed as video real-time, without very much extra processing. After the editor has decided what information to keep (e.g., what frames will be in the final version), a lossless decompressor, such as decompressor 205, can be used to recover the original data. Note that the data may be retrieved from a store that contains only the edited data or which contains all or some portion of the original input data. In this case, some logic or processing would be needed to access the correct information for decompression. This processing/logic would be well-known to one skilled in the art.

An enhancement mechanism 206 may be coupled to decompressor 205 to enhance or preprocess the original data, if necessary, without the possibility of compression artifacts being exaggerated. Examples of such enhancement or preprocessing include enlarging part of an image, interpolate between frames to do slow motion, sharpening, noise reduction, etc. These and other well-known enhancement mechanisms are well-known in the art.

After any enhancement, a compressor 207 performs a full MPEG compression with motion compensation to generate the final compressed data. Compressor 207 is well-known in the art.

While the reversible DCT could be used with any lossless decompression application, it is most useful when used with legacy lossy DCT based systems. Other unified lossy/lossless compression system such as compression with reversible wavelets might be used if legacy system compatibility is not important.

The present invention may be extended to any block based transform or any non-overlapped transform that can be decomposed into 2-point rotations. For example, the present invention may be used with the following transforms: DFT/unitary DFT, cosine, sine, Hadamard, Haar, Slant, Karhunen-Loeve, Fast KC, Sinusoidal transforms, a SVD transform, lapped orthogonal transform (LOT), as well as others. See Jain, Anil K., *Fundamentals of Digital Processing*, Prentice-Hall, Inc. 1989, pgs. 132–138. Given these examples and the examples described below, it would be apparent to one skilled in the art to implement other transforms.

Fast DCT Decompositions With the APT

The Allen Parametrized Transform (APT), formally referred to as the Generalized Chen Transform (GCT), reduces the DCT and a family of other related transforms to a cascade of "integer rotations". In one embodiment, each rotation comprises a transform with the absolute value for its determinant being 1. The present invention obtains a reversible DCT by decompressing the DCT into a multiple reversible components. Because the individual parts are reversible, the DCT is reversible.

Figure 3A:
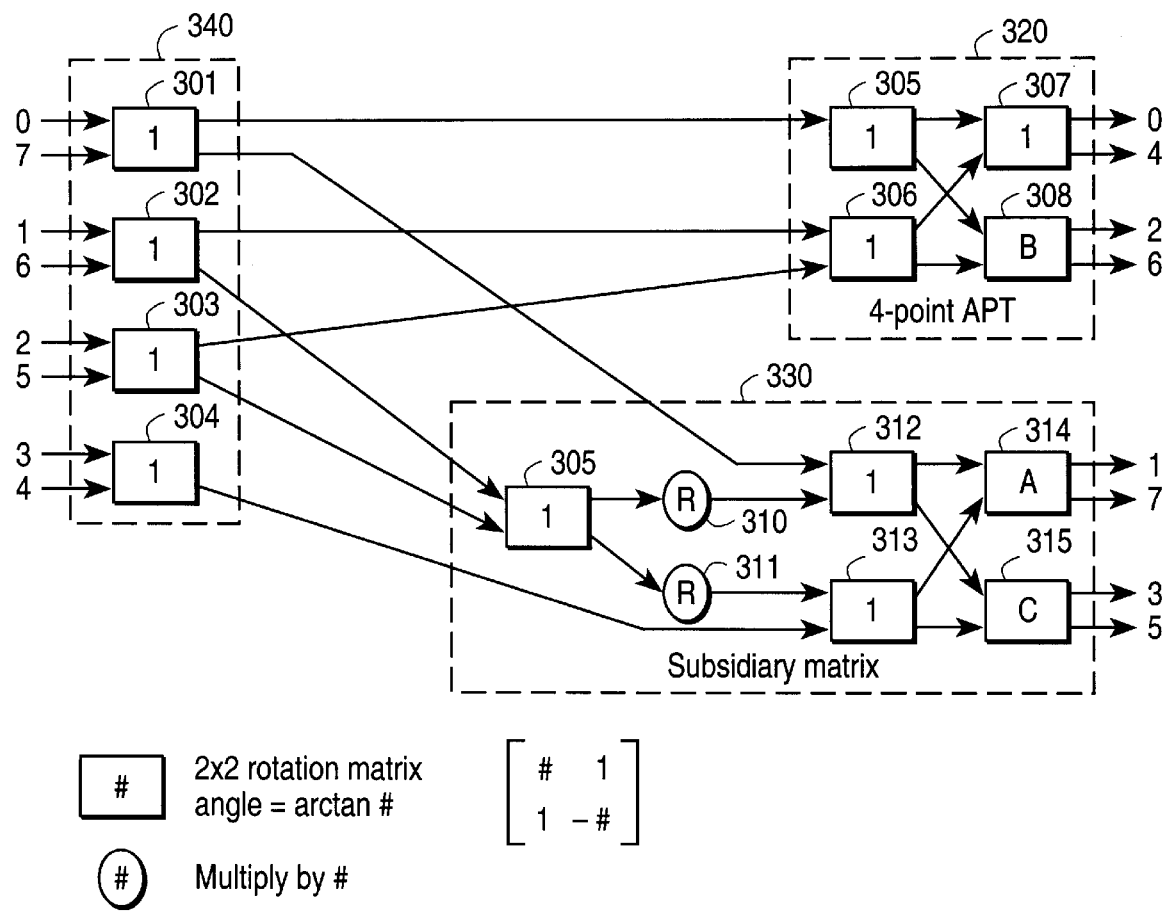
FIG. 3A illustrates a block diagram of one embodiment of a one dimensional (1D), 8-point forward parameterized transform.

FIG. 3A illustrates a block diagram of a 1D, 8-point forward APT. Most of the APT transform is composed of two point rotations which are labeled by the arc tangent of a rotation angle. (The rotations are shown as "clockwise" and with their determinant equal to −1.)

Referring to FIG. 3A, the 8-point transform can be grouped into four initial rotations by 45° (arctan=1) 340, a 4-point APT 320, and a "subsidiary matrix" 330. The subsidiary matrix 330 contains two multiplications in addition to multiple 2-point rotations.

Thus, there are three sets of rotations that form the forward APT transform. First, a set of 2-point (2×2) rotations 301–304 provide an input stage. Outputs from each of rotations 301–304 are coupled to the inputs of four point APT block 320, which contains 2-point rotations 305–308, and subsidiary matrix 330, which contains 2-point rotations 309 and 312–315 and multipliers 310 and 311.

Specifically, rotation 301 receives inputs 0 and 7 corresponding to two input data samples and generates one output to an input of rotation 305 and another output to an input to rotation 312. Rotation 302 is coupled to receive input data samples 1 and 6 and provides two outputs, one coupled to an input of rotation 306 and one coupled to the input of rotation 309. Rotation 303 is coupled to receive input data samples 2 and 5 and generates two outputs, one of which is coupled to the other input to rotation 306 and another coupled to the other input to rotation 09.

Rotation 304 is coupled to receive input data samples 3 and 4 and generates two outputs, one of which is coupled to the other input of rotation 305 and an input to rotation 313.

Rotation 305 generates two outputs, one of which is coupled to an input of rotation 307 and the other is coupled to an input of rotation 308.

Rotation 306 generates two outputs, one of which is coupled to the other input of rotation 307 and the other of which is coupled to the other input to rotation 308. In response to these inputs, rotation 307 generates the 0 and 4 outputs, while rotation 308 generates the 2 and 6 outputs.

With respect to the subsidiary matrix, rotation 309 generates two outputs coupled to multiply-by-R blocks 310 and 311. The output of multiply-by-R block 310 is coupled to the other input of rotation 312, while the output of multiply-by-R block 311 is coupled to the other input to rotation 313. In response to its inputs, rotation 312 generates two outputs that are coupled to an input to rotations 314 and 315. Similarly, in response to its inputs, rotation 313 generates outputs which are coupled to an input to rotation 314 and input to rotation 315. In response to these outputs, rotations 314 and 315 generate the 1 and 7 outputs and the 3 and 5 outputs respectively. The A, B, and C rotations will be described in more detail below. In one embodiment, each of rotations 301–304 may be the S-transform. However, in such a case, mismatch may suffer.

Figure 4:
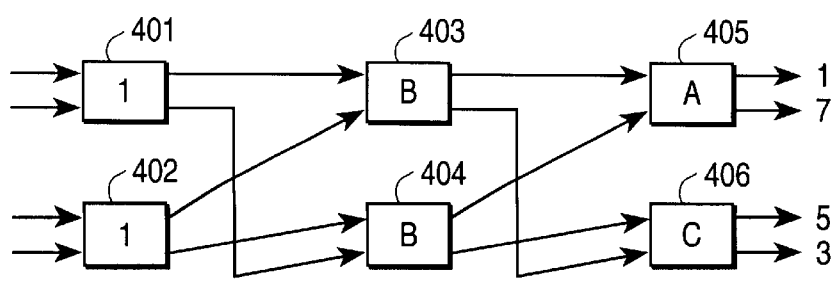
FIG. 4 illustrates the Hein form of the subsidiary matrix of FIG. 3A.

The subsidiary matrix shown in FIG. 3A is the Chen form. An alternative due to Hein and Allen, J. Allen, and described by J. Allen in, "Generalized Chen Transform: A Fast Transform for Image Compression," *Journal of Electronic Imaging*, Vol. 3(4), October 1994, pgs. 341–347, is shown in FIG. 4. Referring to FIG. 4, the subsidiary matrix comprises six rotations (by angle). A pair of rotations by an angle of a rotation by 45° (or arctan=1) are coupled to receive two inputs each and generate two outputs. One of the outputs of each of rotations 401 and 402 is coupled to the inputs of rotation 403, while the other two outputs of rotations 401 and 402 are coupled to the inputs to rotation 404. In response to these inputs, rotations 403 and 404 generate two outputs.

Rotations 403 and 404 comprise the B rotation. One of the outputs of each of rotations 403 and 404 is coupled to the inputs of rotation 405 while the other outputs of each of rotations 403 and 404 is coupled to the inputs to rotation 406. Rotations 405 and 406 comprise the A and C rotations respectively. Each of rotations 405 and 406 generate the two outputs, 1 and 7 and 5 and 3, respectively. In one embodiment, the rotations are 2 point (2×2) rotations. Each rotation may comprise a 2 point transform or filter.

The outputs are scaled to match the DCT. That is, the present invention generates outputs that require the use of scale factors to change the outputs to match those that would result had a floating-point DCT been used. For lossy compression/decompression, scale factors may be combined with quantization factors. The scale factor used for each output can be determined from the product of the individual scale factors for each 2-point rotation. For the 2-point rotation matrix of the form shown in FIG. 3A, the scale factor for both outputs of every rotation is given by the following equation:

$$scalefactor = \frac{1}{\sqrt{-\det\begin{bmatrix} \# & 1 \\ 1 & -\# \end{bmatrix}}} = \frac{1}{\sqrt{\#^2 + 1}}$$

For the following 2-point transforms:

$$\begin{bmatrix} a & b \\ b & -a \end{bmatrix}$$

the scale factor is $$\frac{1}{\sqrt{-\det\begin{bmatrix} a & b \\ b & -a \end{bmatrix}}} = \frac{1}{\sqrt{a^2 + b^2}}$$

For the following 2-point transforms:

$$\begin{bmatrix} a & b \\ c & d \end{bmatrix}$$

the scale factor is $$\frac{1}{\sqrt{a^2 + b^2}}$$

for an output due to a,b and $$\frac{1}{\sqrt{c^2 + d^2}}$$

for an output corresponding to c,d.

The separable two dimensional (2D), 64 point DCT (APT) can be implemented with eight 1D, 8-point DCTs (APTs), a transpose, and another eight 1D, 8-point DCTs (APTs).

Figure 3B:
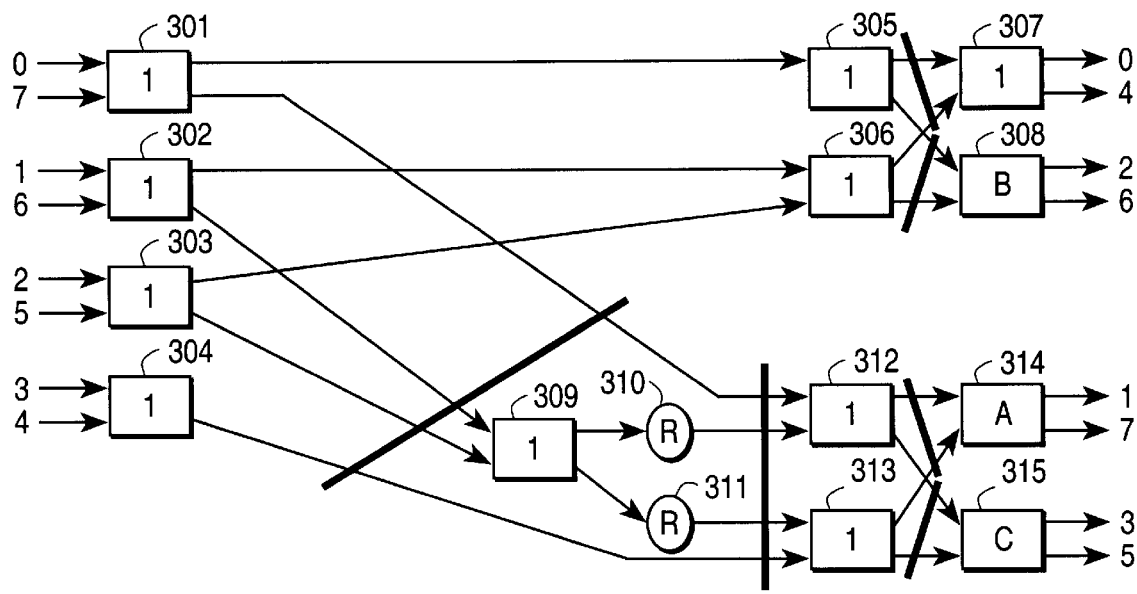
FIG. 3B illustrates intermediate values in a parameterized transform which have the same scale factor.

FIG. 3B illustrates intermediate values in the APT which have the same scale factor. Referring to FIG. 3B, each shaded lines indicates inputs that have the same scale factor. Using the same scale factors constrains the divisors in two-point transforms. For example, most rotations by 1 (all but 309) are not required to have the same scale factor for both outputs, so an unbalanced transform such as the S-transform could be used. In contrast, the cascade of a rotation by 1 followed by multiplication by R (309) must have the same scale factors on the output as the input.

Referring to FIG. 3B, the two inputs for rotation 307 have the same scale factors. The two inputs to rotation 308 have the same scale factors. The two inputs to rotation 314 have the same scale factors and the inputs to rotation 315 have the same scale factors. The inputs to rotations 305 and 306 are the same. In the case of rotation 305, this would constrain the upper branches from each of rotations 301 and 304. With respect to rotations 312 and 313, not only do their inputs have the same scale factors, but also all the lower branches from each of rotations 301 and 304 have the same scale factors. Because the scale factors of the lower branches output from rotations 301 and 304 have the same scale factors as the lower branch outputs of rotations 302 and 303, then the scale factors of all inputs to the subsidiary matrix are the same.

The product of the scale factors of two outputs is the amount of expansion. Therefore, to be efficient, the product of both scale factors must ideally be 1 to prevent expansion. In one embodiment, to be reversible, both scale factors are 1. In alternative embodiments, the scale factors can be slightly different. For example, both scale factors could 0.99.

Table 1 illustrates values for APT parameters for three different embodiments. The first set of parameters are the irrational numbers that result in the DCT. DCT implementations (APT or other) for compression cannot use the irrational values. All actual DCT implementations approximate irrational parameters, even if the approximations are very accurate high precision floating point approximations. The APT uses rational approximations with small integers, which leads to tractable reversible implementations.

TABLE 1

APT parameters

| | DCT | APT 1 | APT 2 | APT 3 |
|---|---|---|---|---|
| A | TAN 7 π/16 ≈ 5.0273 | 5/1 = 5.0000 | 5/1 = 5.0000 | 643/128 = 5.0234 |
| B | TAN 6 π/16 ≈ 2.4142 | 12/5 = 2.4000 | 128/53 = 2.4000 | 128/53 = 2.4151 |
| C | TAN 5 π/16 ≈ 1.4966 | 3/2 = 1.5000 | 3/2 = 1.5000 | 383/256 = 1.4961 |
| R | SQRT 1/2 ≈ 0.7071 | 128/181 = 0.7072 | 128/181 = 0.7072 | 128/181 = 0.7072 |

Table 1 shows three sets of APT parameters which trade-off simplicity vs. mismatch. APT 1 is simple and good for compression. The other examples, APT 2 and APT 3, are closer approximations to the irrational transform. APT 3 meets the CCITT Rec. H.261 (IEEE std 1180–1990) accuracy test.

The choice of APT parameters is not the only source of mismatch in a reversible transform. Reversible, efficient transforms require careful (reversible) rounding to integers at each step of the transform. These rounding operations also cause mismatch. Some mismatch is unavoidable because methods that result in the same coefficients as a floating point implementation cannot be efficient, reversible. Since mismatch due to rounding usually dominates mismatch due to parameter choice, the APT 1 parameters may be a good choice. However, the techniques of the present invention could be applied to other parameters.

It should be noted that these APT parameters may be adjusted to obtain other transforms, which may or may not be reversible.

Reversible DCT Implementations

In the present invention, each 2-point rotation in the APT components are made reversible. By making each reversible, the entire APT is made reversible because each step may be reversed. In addition to efficiency, two other properties are desirable: balanced scale factors and no internal rounding.

A 2-point transform has "balanced" scale factors if the scale factors for both outputs are the same. For a transform to be efficient (or almost efficient), it's determinant is ±1 (or almost ±1). If the determinant is constrained to be ±1, the product of the scale factor for the two outputs is 1. Having both scale factors equal to 1 is desirable. In another embodiment, one scale factor is the reciprocal of the other. In this case, one scale factor is greater than 1. In this manner, the determinant will be ±1. A scale factor greater than 1 causes quantization, resulting in mismatch.

Note that the scale factors in the equation given above are for an APT that is not efficient so their product is not one. Having both scale factors less than 1 leads to good rounding allowing for low mismatch, but such a system is not reversible, efficient.

Rounding at each step allows reversibility. A 2-point rotation with "no internal rounding" indicates that at most only two rounding operations at the output of each step are performed. Some implementations have additional rounding operations inside the step, for example the ladder filter implementations described below. Extra rounding operations increase mismatch.

When used for lossy compression, the DCT is unitary so the same transform can be used for both the forward transform and the inverse transform. However, in the present invention, for reversible implementations, the inverse transform inverts the rounding.

Therefore, the inverse transform has the inverse data flow of FIG. 3 with each forward 2-point transform and multiplication replaced with the corresponding inverse transform.

Reversible Implementations Without Internal Rounding or Look Up Tables

In one embodiment, the present invention provides reversible implementations of 2-point rotations and multiplications that do not require internal rounding or look up tables. For parameters that have efficient, balanced 2-point rotations of this type, these are important building blocks. Some 2-point transforms are described below that are not balanced or only almost efficient. Ladder filter and look up table alternatives are provided.

The choice of offsets often controls achieving reversibility. A discussion of how only some offsets results in reversible transforms is given below.

"1": 1,1-transform, S-Transform—unbalanced

In one embodiment, the "1" blocks may be implemented with the following transform where a and b are the inputs to the forward transform and x and y are the outputs of the forward transform:

$$x = \left\lfloor \frac{a+b}{2} \right\rfloor \quad a = x + \left\lfloor \frac{y+1}{2} \right\rfloor$$

$$y = a - b \quad b = x - \left\lceil \frac{y-1}{2} \right\rceil$$

Note that the floor ($\lfloor . \rfloor$) and ceiling ($\lceil . \rceil$) functions mean to round towards negative infinity and positive infinity respectively.

In one embodiment, scale factors are $\sqrt{2}$ and $1/\sqrt{2}$ respectively.

"A":5,1-transform—unbalanced

The following is one embodiment of the "A" rotation.

$$x = \left\lfloor \frac{5a+b+13}{26} \right\rfloor \quad a = 5x - 2 + \left\lfloor \frac{y-13+5\delta}{26} \right\rfloor$$

$$y = a - b \quad b = x - 1 + \left\lfloor \frac{-5y+13+\delta}{26} \right\rfloor$$

where the recovered least significant bits are given by the equation (i.e., rounded away bits):

$$\delta \equiv (5y-13) \bmod 26$$

In this embodiment, scale factors are $\sqrt{26}$ and $1/\sqrt{26}$ respectively.

"A":5,1-transform—balanced, inefficient

The following is an alternate embodiment of the A rotation.

$$x = \left\lfloor \frac{5a+b+2}{5} \right\rfloor \quad a = \left\lfloor \frac{25x+5y-13+5\delta_2+\delta_1}{26} \right\rfloor$$

$$y = \left\lfloor \frac{a-5b=2}{5} \right\rfloor \quad b = \left\lfloor \frac{5x-25y+8-5\delta_1+\delta_1}{26} \right\rfloor$$

where $\delta \equiv (-(25x+5y-12)) \bmod 26$ $\delta_1 = \delta \bmod 5$ $\delta = \lfloor \delta/5 \rfloor$ This transform has determinant 26/25=1.04. Therefore, the redundancy is $\log_2 1.04 = 0.06$ bits. It is inefficient, but close enough to efficient to be useful for lossless compression. Because it is balanced, it is more useful for lossy than the balanced efficient version.

In one embodiment, scale factors are both $5/\sqrt{26}$.

"A":60,11-transform–balanced, efficient

Another alternative embodiment of the "A" rotation is as follows:

$$x = \left\lfloor \frac{60a+11b+30}{61} \right\rfloor \quad a = \left\lfloor \frac{60x+11y+30}{61} \right\rfloor$$

$$y = \left\lfloor \frac{11a-60b+30}{61} \right\rfloor \quad b = \left\lfloor \frac{11x-60y+30}{61} \right\rfloor$$

This transform is balanced and efficient. This transform uses 11, 60, 61 which is a Pythagorean triplet a, b, c with b+1=c and $a^2 = 2b+1$. However, the result of $60/11 \cong 5.4545$, which is not a very good approximation for $\tan 7\pi/16 \cong 5.0273$. Here, the closeness to the DCT has been sacrificed for balanced, efficiency and simplicity in computation.

In this case, scale factors are both 1.

"B":12,5-transform

The following is one embodiment for the "B" rotation:

$$x = \left\lfloor \frac{5a-12b+6}{13} \right\rfloor \quad a = \left\lceil \frac{12x+5y-6}{13} \right\rceil$$

$$y = \left\lfloor \frac{5a-12b+6}{13} \right\rfloor \quad b = \left\lfloor \frac{5x-12y+6}{13} \right\rfloor$$

This is both balanced and efficient. The numbers 5, 12, 13 are a Pythagorean triplet a, b, c with b+1=c and $a^{2=2}b+1$. This leads to a very good 4point APT (DCT).

Scale factors are both 1.

Note that offsets are very important for reversibility. The choice of +6 for both offsets in the forward transform of the equation above results in a reversible transform, while other offsets do not. For example, if the offsets are both zero as in the first set of equations below, then the inputs a=0, b=0 and a=1, b=0 both result in x=0, y=0.

$$x = \left\lfloor \frac{12a+5b}{13} \right\rfloor$$

$$y = \left\lfloor \frac{5a-12b}{13} \right\rfloor$$

It is apparent from this result that the selection of the offset can control reversibility.

Another example is shown below where both offsets are +5. In this case, inputs a=4, b=0 and a=4, b=1, both result in x=4, y=1.

$$x = \left\lfloor \frac{12a+5b+5}{13} \right\rfloor$$

$$y = \left\lfloor \frac{5a-12b+5}{13} \right\rfloor$$

Most pairs offsets do not result in a reversible transform. Of the 169 possible pairs of offsets (offsets are 0 . . . 12), the only 13 pairs of offsets that result in reversibility are 0, 10; 1,5; 2,0; 3,8; 4,3; 5,11; 6,6; 7,1; 8,9; 9,4; 10,12; 11,7 and 12,2.

"C": 3,2-transform—unbalanced

One embodiment of the "C" rotation is as follows:

$$x = \left\lfloor \frac{3a+2b+6}{13} \right\rfloor \quad a = 3x - 1 + \left\lfloor \frac{2y-5+3\delta}{13} \right\rfloor$$

$$y = 2a - 3b \quad b = 2x - 1 + \left\lfloor \frac{-3y+1+2\delta}{13} \right\rfloor$$

$$\delta \equiv (6-5y) \bmod 13$$

This is an efficient transform. In this case, scale factors are $\sqrt{13}$ and $1/\sqrt{13}$ respectively.

"C": 3,2-transform—unbalanced with growth in sum

An alternate embodiment of the "C" rotation, which is unbalanced with growth in the sum, yet efficient, is as follows:

$$x = 3a + 2b \quad a = \left\lfloor \frac{3x-12+3\delta}{13} \right\rfloor + 2y$$

$$y = \left\lfloor \frac{2a-3b+6}{13} \right\rfloor \quad b = \left\lfloor \frac{2x+5-3\delta}{13} \right\rfloor - 3y + 1$$

$$\delta \equiv (6+5x) \bmod 13$$

In this case, scale factors are $1\sqrt{13}$ and $\sqrt{13}$ respectively.

It is convenient in unbalanced transforms to divide the sum by the larger divisor. This leads to minimum growth in coefficient size. However, the sum leads to more visually relevant coefficients. Using the larger divisor on the difference and allowing more growth in the sum leads to lower mismatch in the more visually relevant coefficients.

"C" :4,3-transform-balanced

An alternate embodiment of the "C" rotation, which is balanced is as follows:

$$x = \left\lfloor \frac{4a+3b+2}{5} \right\rfloor \quad a = \left\lfloor \frac{4x+3y+2}{5} \right\rfloor$$

$$y = \left\lfloor \frac{3a-4b+2}{5} \right\rfloor \quad b = \left\lfloor \frac{3x-4y+2}{5} \right\rfloor$$

This transform is balanced and efficient. Again, the number set 3, 4, 5 is a Pythagorean triplet a, b, c with b+1=c and $a^2 = 2b+1$. However $4/3 \cong 1.3333$ is not a very good approximation for $\tan 5\pi/16 \cong 1.4966$.

Scale factors are both 1.

The Multiplier "R": $\sqrt{2}$

In one embodiment, the multiplication factor using an integer approximation of $\sqrt{2}$. The R factor normalizes the subsidiary matrix.

$$x = \left\lfloor \frac{256a + 90}{181} \right\rfloor \quad a = \left\lfloor \frac{181x + \delta - 90}{256} \right\rfloor$$

$$\delta = (90 - 181x) \bmod 256$$

$$0 \le \delta < 181$$

Non-DCT Transforms

Figure 5A:
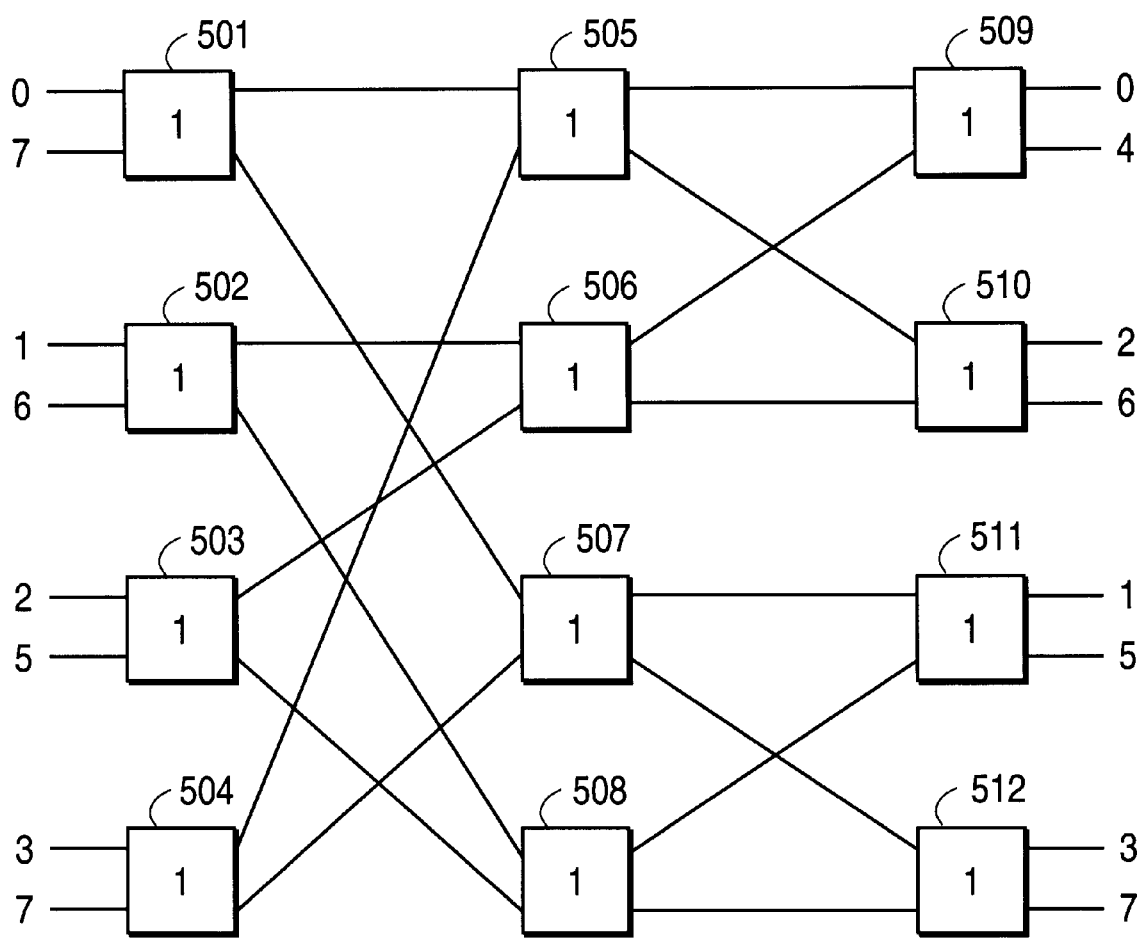
FIG. 5A is a block diagram of one embodiment of an 8-point Hadamard transform according to the present invention.

FIG. 5A illustrates and 8-point Hadamard transform. Referring to FIG. 5A, rotations 501–512 comprise 2-point rotations by tan(π/4)=1. Rotation 501 is coupled to receive input data samples 0 and 7 and generate outputs to rotations 505 and 507. Rotation 502 is coupled to receive input data samples 1 and 6 and generate outputs to rotations 506 and 508. Rotation 503 is coupled to receive input data samples 2 and 5 and provide outputs to rotations 506 and 508, while rotation 504 is coupled to receive input data samples 3 and 4 and provide outputs to rotation 505 and 508.

In response to its inputs, rotation 505 generates outputs to rotations 509 and 510. In response to its inputs, rotation 506 generates outputs to rotations 509 and 510 as well. In response to these inputs, rotation 509 generates output samples 0 and 4, and in response to its inputs, rotation 510 generates output samples 2 and 6.

Rotation 507 generates outputs to rotation 511 and 512. Rotation 508 also generates outputs to rotation 511 and 512. In response to these inputs, rotation 505 generates output samples 1 and 5, while rotation 512 generates output samples 3 and 7.

Figure 5B:
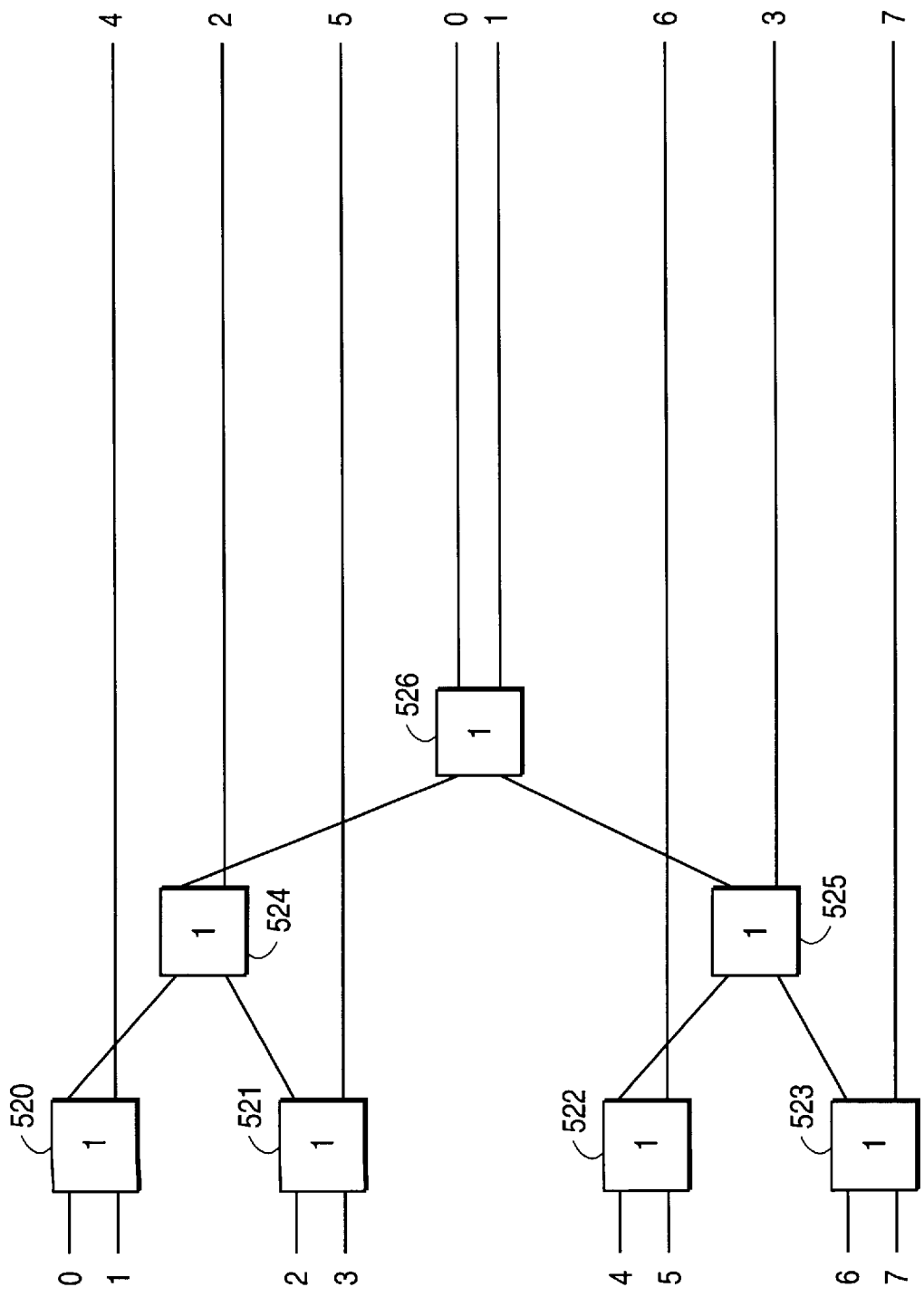
FIG. 5B is a block diagram of one embodiment of an 8-point Haar transform according to the present invention.

FIG. 5B shows an 8-point Haar transform. Referring to FIG. 5B, the Haar transform comprises rotations 520–526 which are each 2-point rotations by tan(π/4)=1. Rotation 520 is coupled to receive input data samples 0 and 1 and generate output data sample 4 and one output to rotation to 524. Rotation 521 is coupled to receive input data samples 2 and 3 and generate outputs to rotation 524 and the output data sample 5.

Rotation 522 is coupled to receive input data samples 4 and 5 and generate outputs to rotation 525 and output data sample 6. Rotation 523 is coupled to receive input data samples 6 and 7 and generate outputs to rotation 525 and the output data sample 7. In response to its inputs, rotation 524 generates the output data sample 2 and an output to rotation 526. Rotation 525 generates an output to rotation 526 and generates output data sample 3. Rotation 526 outputs samples 0 and 1 in response to its inputs.

Figure 5C:
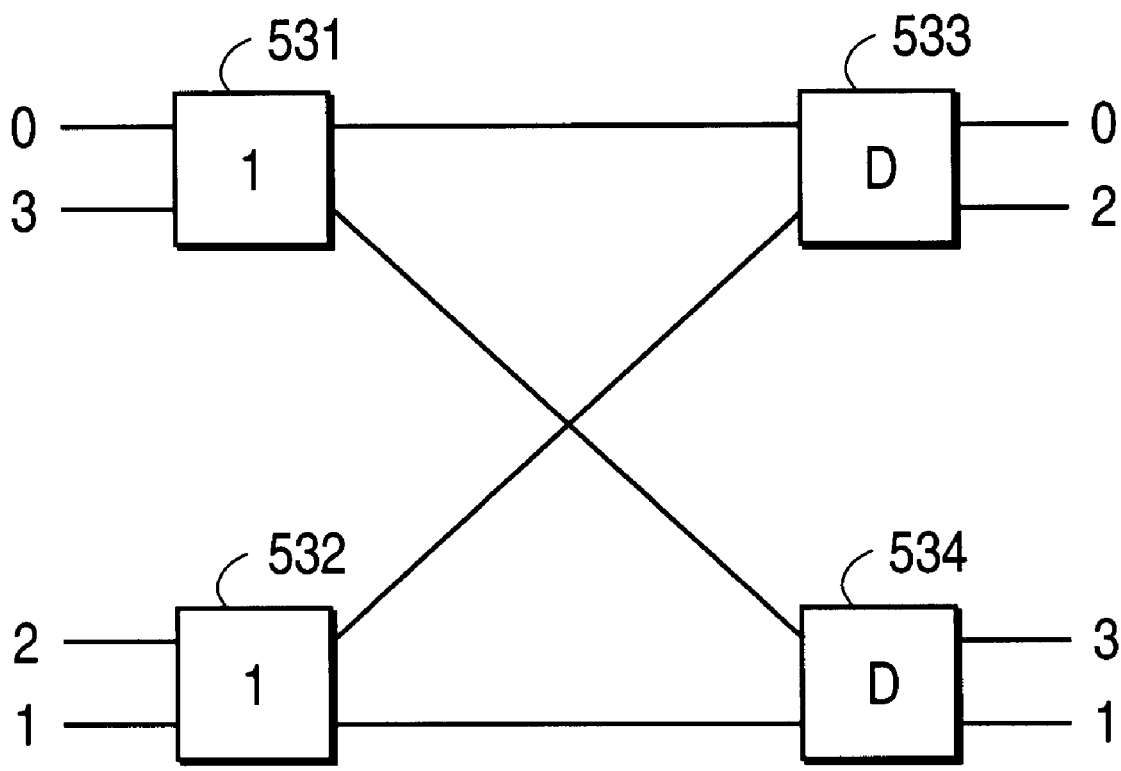
FIG. 5C is a block diagram of one embodiment of a 4-point Sine transform according to the present invention.

FIG. 5C illustrates on embodiment of the 4 point Sine transform. Referring to FIG. 5C, the Sine transform comprises rotations 531–534. Rotations 531 and 532 comprise 2-point rotations by tan(π/4)=1, while rotations 533 and 534 comprise rotations by D which is set forth as the tan (0.1762π).

Rotation 531 is coupled to receive the input data samples 0 and 3 and produce outputs to rotations 533 and 534, while rotation 532 is coupled to receive input data samples 2 and 1 and generate outputs to rotations 533 and 534. In response to their respective inputs, rotation 533 generates output data samples 0 and 2, while rotation 534 generates output samples 3 and 1.

Figure 5D:
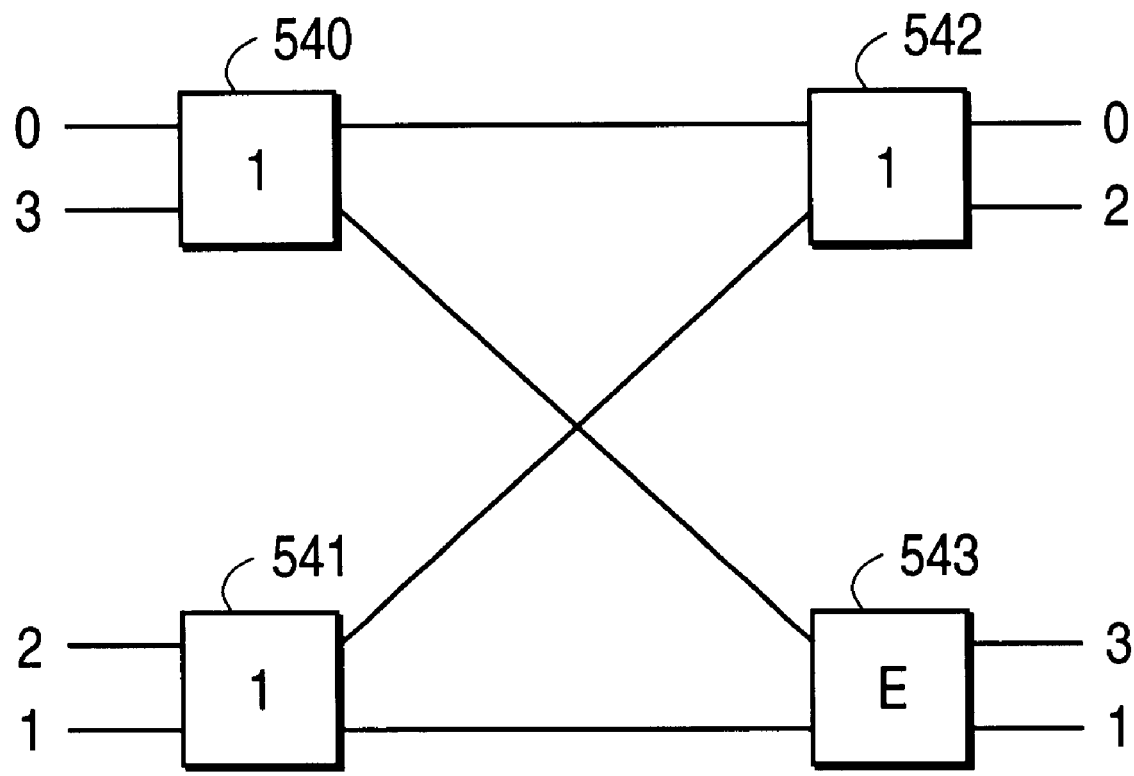
FIG. 5D is a block diagram of one embodiment of a 4-point Slant transform according to the present invention.

FIG. 5D illustrates one embodiment of the 4-point Slant transform. Referring to FIG. 5D, the Slant transform comprises rotations 540–543. Rotations 540–542 comprise 2-point rotations by tan(n/4)=1, while rotation 543 comprises a 2-point rotation by tan(0.1024π). Rotation 540 is coupled to receive input data samples 0 and 3 and provide outputs to rotations 542 and 543, while rotation 541 is coupled to receive input data samples 2 and 1 and generate outputs to rotations 542 and 543. In response to its inputs, rotations 542 generates output data samples 0 and 2, while rotation 543 generates output samples 3 and 1. Given these examples described above, one skilled in the art may implement other transforms as well.

Efficient, Reversible 2-point Rotations Using Ladder Filters

Ladder filters can be used to implement any 2-point rotation in a reversible, efficient, balanced fashion. Ladder filters have both scale factors equal to 1. The equation below is a ladder filter decomposition for a determinant 1 (counterclockwise) rotation.

$$\begin{bmatrix} \cos\theta & \sin\theta \\ -\sin\theta & \cos\theta \end{bmatrix} = \begin{bmatrix} 1 & 0 \\ \frac{\cos\theta - 1}{\sin\theta} & 1 \end{bmatrix} \begin{bmatrix} 1 & \sin\theta \\ 0 & 1 \end{bmatrix} \begin{bmatrix} 1 & 0 \\ \frac{\cos\theta - 1}{\sin\theta} & 1 \end{bmatrix}$$

Figure 6:
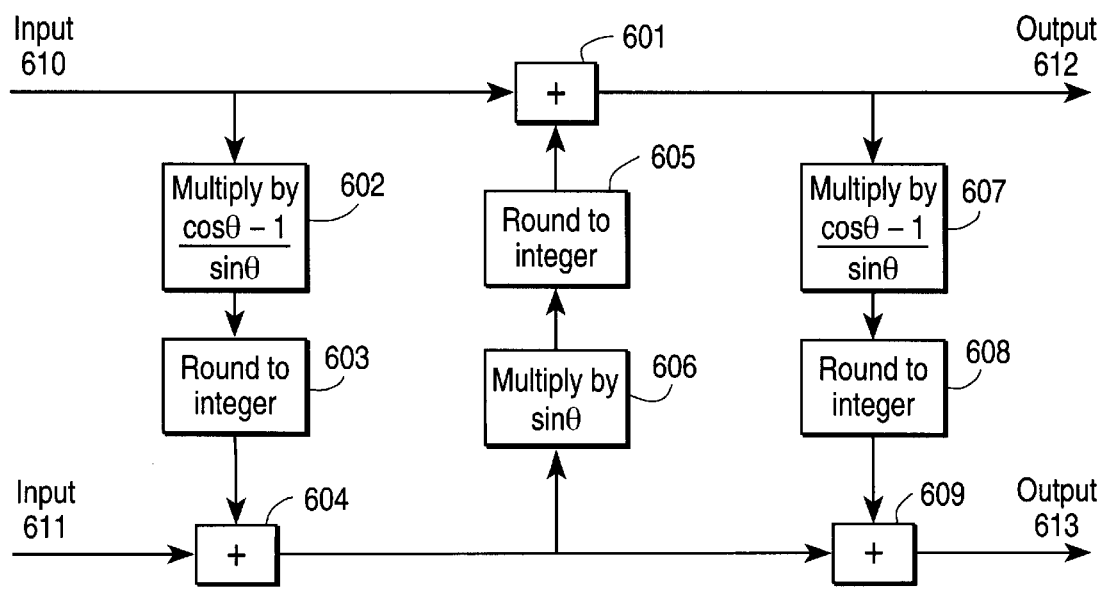
FIG. 6 illustrates one embodiment of a forward ladder filter of a 2-point rotation.
Figure 7:
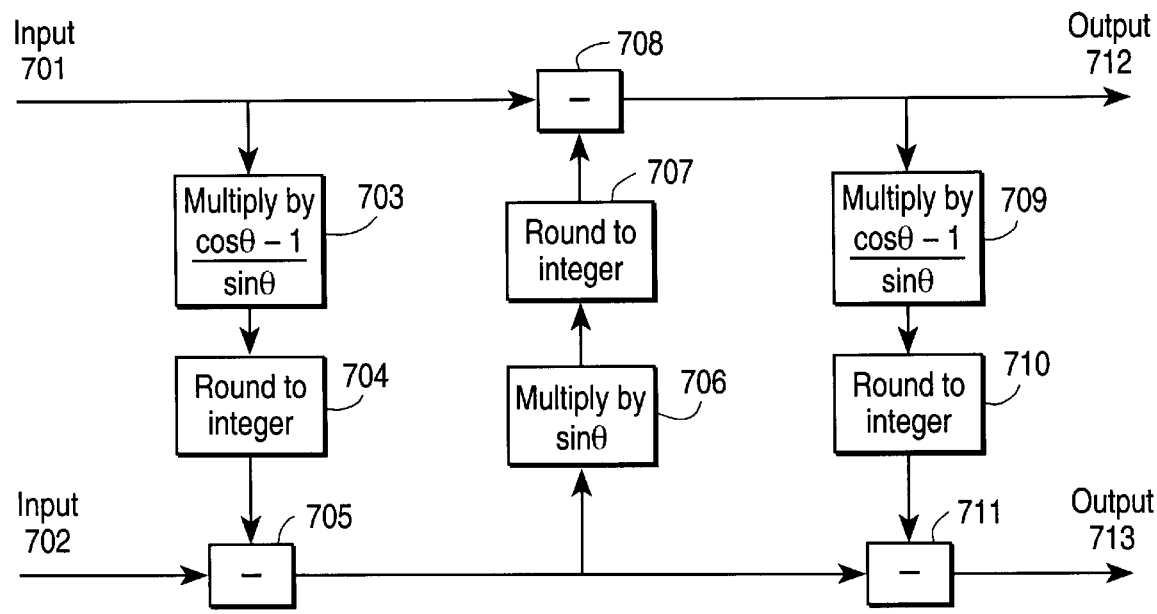
FIG. 7 illustrates one embodiment of an inverse ladder filter of a 2-point rotation.

To be reversible and efficient, each multiplication is followed by rounding to integer as shown in FIGS. 6 and 7. To be reversible, multiplications by irrationals are performed the same in the forward and inverse transforms.

Referring to FIG. 6, a ladder filter implementation is shown having inputs 610 and 611. Input 611 is coupled to a multiplier 602 which multiplies input 610 by the quantity of cos θ-1 divided by sin θ. The result of the multiplication is rounded to the nearest integer at block 603. The results of the rounding are added to input 611 by adder 604. The output of adder 604 is coupled to multiplier 606 which multiplies the output of adder 604 by sin θ. The result is rounded to integer at block 605. The results of the rounding are added to input 610 using adder 601. The output of adder 601 is one output of the ladder filter, output 612. The output of adder 601 is also input to multiplier 607 which multiplies the output of the adder 601 by the quantity of cosθ-1 divided by sinθ. The results of the multiplication are rounded to integer by block 608. The results of rounding are added to the output of adder 604 using adder 609. The output of adder 609 is the other output of the ladder filter, output 613.

Referring to FIG. 7, two inputs, inputs 701 and 702, are input into the ladder filter. Input 701 is input to multiplier 703 which multiplies input 701 by $$\frac{\cos\theta - 1}{\sin\theta}.$$

The results of the multiplication are rounded to integer by block 704. The results of the rounding are subtracted from input 702 by subtractor 705. The output of subtractor 705 is coupled to the input of multiplier 706 which multiplies it by sine. The results of the multiplication are rounded to integer by block 707. The results of the rounding are subtracted from input 701 by subtractor 708. The output of subtractor 708 is one output of the ladder filter, output 712.

The output of subtractor 708 is also coupled to the input of multiplier 709 which multiplies it by $$\frac{\cos\theta - 1}{\sin\theta}.$$

The results of the multiplication are rounded to integer by block 710. The results of the rounding are subtracted from the output of subtractor 705 by subtractor 711. The output of subtractor 711 is the other output of the ladder filter, output 713.

The effect of the three rounding operations and the effect of the precision of implementing the irrational multiplications causes mismatch error. Ladder filter implementations often have more mismatched error than other implementations.

Instead of decomposing the whole DCT into 2×2 rotations, larger ladder filters can be constructed. For example, the 4point DCT can be implemented as a ladder filter by decomposing into three matrices as shown below:

$$\begin{bmatrix} 1 & 0 & 0 & 0 \\ a_1 & 1 & 0 & 0 \\ b_1 & c_1 & 1 & 0 \\ d_1 & e_1 & f_1 & 1 \end{bmatrix} \begin{bmatrix} 1 & a_2 & b_2 & c_2 \\ 0 & 1 & d_2 & e_2 \\ 0 & 0 & 1 & f_2 \\ 0 & 0 & 0 & 1 \end{bmatrix} \begin{bmatrix} 1 & 0 & 0 & 0 \\ a & 1 & 0 & 0 \\ b & 0 & 1 & 0 \\ c & 0 & 0 & 1 \end{bmatrix}$$

These matrices contain the following constants:

$$r = \frac{1}{\sqrt{2}}$$

$$x = \cos\frac{\pi}{8}$$

$$y = \sin\frac{\pi}{8}$$

$$a = \frac{x + y + 2rxy - 4ry^2}{2ry^2}$$

$$b = \frac{-(x + 3y + 2rxy)}{wry^2}$$

$$c = 1 + \frac{1}{ry}$$

$$a_1 = 2(-1 + ry)$$

$$b_1 = -1 + \frac{1}{ry}$$

$$c_1 = \frac{1}{2ry}$$

$$d_1 = 1 - 2rx + \frac{x^2}{y^2} + 2\frac{x}{y} + \frac{2rx^2}{y} + 2ry$$

$$e_1 = \frac{-(x^2 + 2xy + 2rx^2y + y^2 = 2ry^3)}{2y^2}$$

$$f_1 = \frac{-r(1 + 2ry)(x^2 + y^2)}{y}$$

$$a_2 = \frac{1}{2}$$

$$b_2 = \frac{1}{2}$$

$$c_2 = 1 - 2ry$$

$$d_2 = \frac{1}{2}$$

$$e_2 = 1 - rx - ry$$

$$f_2 = \frac{3}{2} + \frac{x}{2y}$$

Thus the present invention provides a novel 4-point reversible, as well as performing an efficient, reversible 2×2 decomposition for the 4 point (4×4) rotation.

It should be noted that although in the above description the transform includes a 2-point DCT, 4-point APT and an 8-point×8 non-trivial matrix, the present invention may be expanded to other sizes such as 16×16, for example.

Look Up Tables for Efficient Reversible 2-point Rotations

Ladder filters can be used to make an efficient, reversible implementation for any 2-point rotation. The present invention provides a look up table based method and apparatus for controlling rounding to create efficient, reversible transforms that have improved rounding. Improved rounding reduces mismatch error. Balanced transforms can be constructed, and if a transform is balanced, then both scale factors are 1.

Given a transform with determinant greater than or equal to 1, a one-to-one or one-to-many mapping input values to transformed values is possible. For reversible transforms, only a one-to-one mapping is of interest. For transforms with a determinant slightly greater than one, a small number of the possible transformed values can be unused and the mapping can be treated as one-to-one.

There are 2-point integer rotations that cannot be made reversible with any fixed choice of rounding offsets. For example, consider the following equations which is a 45° rotation using the approximation given for APT parameter R in Table 1.

$$\begin{bmatrix} \cos 45° & \sin 45° \\ \sin 45° & -\cos 45° \end{bmatrix} = \begin{bmatrix} \frac{1}{\sqrt{2}} & \frac{1}{\sqrt{2}} \\ \frac{1}{\sqrt{2}} & -\frac{1}{\sqrt{2}} \end{bmatrix} \rightarrow \begin{bmatrix} x \\ y \end{bmatrix}$$

$$= \frac{1}{\sqrt{2}} \begin{bmatrix} 1 & 1 \\ 1 & -1 \end{bmatrix} \begin{bmatrix} a \\ b \end{bmatrix}$$

$$x = \frac{128a + 128b + f(a, b)}{181}$$

$$y = \frac{128a - 128b + g(a, b)}{181}$$

$$x = \frac{128(a + b) + f((a + b) \bmod 181, (a - b) \bmod 181)}{181}$$

$$y = \frac{128(a - b) + g((a + b) \bmod 181, (a - b) \bmod 181)}{181}$$

This is not reversible for any constant rounding offsets. However, if the rounding offsets are functions of the inputs, then the function can be made to be reversible. That is, the rounding varies as a function of the inputs. Furthermore, in this case, the rounding offsets are only functions of the sum and difference of the inputs modulo the divisor of 181. An example of the function is described below in conjunction with Table 2. Therefore, there are only 181*181=32761 pairs of rounding offsets.

In one embodiment, the modulo portion of the above equation is removed.

Figure 8:
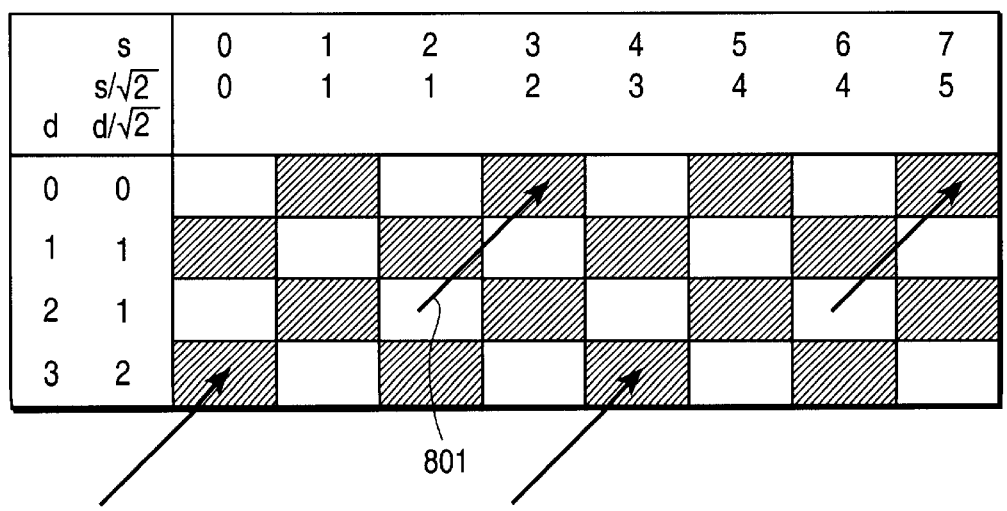
FIG. 8 illustrates a portion of the mapping for a 45° rotation.

FIG. 8 shows a portion of the mapping of input values to output transformed values for the 45° rotation. The above equality may be rewritten as $$\begin{bmatrix} x \\ y \end{bmatrix} = \frac{1}{\sqrt{2}} \begin{bmatrix} s \\ d \end{bmatrix}$$

The sum and difference of the inputs are s and d respectively (s=a+b, d=a−b). Note the parity of the sum and difference are the same; that is, both are even or both are odd. The shaded squares indicate pairs of values that cannot occur since the parity is not the same. Only the unshaded pairs of values actually occur. Also shown is the s and d divided by $\sqrt{2}$ with normal rounding to integer. The heavy lines group pairs of values with the same $s/\sqrt{2}$ and $d/\sqrt{2}$. The mapping is one-to-one already for every heavy line region than has a single unshaded square. Regions with two unshaded squares indicate problems where "collisions" or "holes" occur, where normal rounding maps two possible inputs to the same transform values and they both would give the same answer. Regions with only a shaded square indicates "extras," i.e. transform output values that would not be used with normal rounding. The arrows show how with proper rounding, the mapping can be made to be one-to-one by using the output values for extras for the input values that are collisions.

For example, where the s and d inputs are 2 and 2, the output will not be 1,1. Instead, it will be 0,2 (see arrow 801). When performing the inverse, a look-up table entry for 0,2 would point to output 1,1. The determinant $\geq 1$ condition guarantees that for each collision, there is at least one extra. If the collisions are represented by nearby extras, mismatch due to rounding is reduced and may be minimized.

Figure 9:
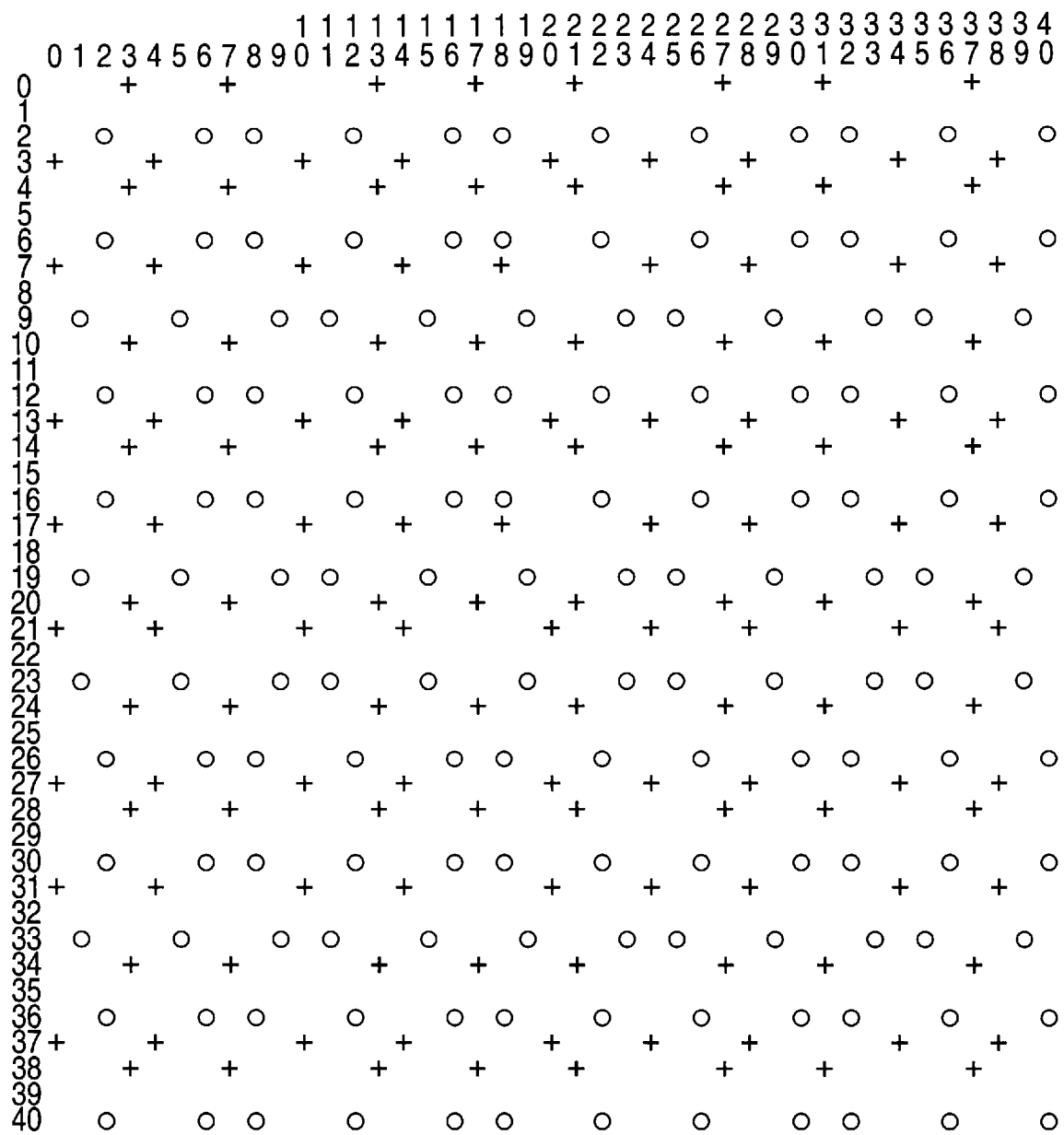
FIG. 9 illustrates extras ("+") and collisions ("o") for 45° rotation.

FIG. 9 shows the collisions ("O") and extras ("+") for a 45° rotation using the approximation $1/\sqrt{2} \approx 29/41 = 0.7073$. (The smaller denominator of 41 is used instead of 181 so all possibilities can be shown on the page. The corresponding figure for a denominator of 181 is similar.) In this example, the determinant is very close to 1(1.0006) and the number of extras is equal to the number of collisions.

The number of collisions or the number of extras that do not have a pair is indicative of the expansion of the transform.

Table 2 shows an example mapping for a 5° rotation using the approximation $1/\sqrt{2} \approx 5/7 = 0.7143$.

TABLE 2

Example Mapping

| sum, difference inputs | | floating point outputs | | integer outputs for reversibility | | rounding offset | | sum of squared error |
|---|---|---|---|---|---|---|---|---|
| 0 | 0 | 0.00 | 0.00 | 0 | 0 | 0 | 0 | 0.000 |
| 2 | 0 | 1.41 | 0.00 | 1 | 0 | 0 | 0 | 0.172 |
| 4 | 0 | 2.83 | 0.00 | 3 | 0 | 0 | 0 | 0.029 |
| 6 | 0 | 4.24 | 0.00 | 4 | 0 | 0 | 0 | 0.059 |
| 1 | 1 | 0.71 | 0.71 | 1 | 1 | 0 | 0 | 0.172 |
| 3 | 1 | 2.12 | 0.71 | 2 | 1 | 0 | 0 | 0.101 |
| 5 | 1 | 3.54 | 0.71 | 4 | 1 | | | 0.302 |
| 0 | 2 | 0.00 | 1.41 | 0 | 1 | 0 | 0 | 0.172 |
| 2 | 2 | 1.41 | 1.41 | 2 | 0 | 1 | −1 | 2.343 |
| 4 | 2 | 2.83 | 1.41 | 3 | 1 | 0 | 0 | 0.201 |
| 6 | 2 | 4.24 | 1.41 | 3 | 2 | −1 | 1 | 1.887 |
| 1 | 3 | 0.71 | 2.12 | 1 | 2 | 0 | 0 | 0.101 |
| 3 | 3 | 2.12 | 2.12 | 2 | 2 | 0 | 0 | 0.029 |
| 5 | 3 | 3.54 | 2.12 | 4 | 2 | 0 | 0 | 0.230 |
| 0 | 4 | 0.00 | 2.83 | 0 | 3 | 0 | 0 | 0.029 |
| 2 | 4 | 1.41 | 2.83 | 1 | 3 | 0 | 0 | 0.201 |
| 4 | 4 | 2.83 | 2.83 | 3 | 3 | 0 | 0 | 0.059 |
| 6 | 4 | 4.24 | 2.83 | 4 | 3 | 0 | 0 | 0.088 |
| 1 | 5 | 0.71 | 3.54 | 1 | 4 | 0 | 0 | 0.302 |
| 3 | 5 | 2.12 | 3.54 | 2 | 4 | 0 | 0 | 0.203 |
| 5 | 5 | 3.54 | 3.54 | 4 | 4 | 0 | 0 | 0.431 |
| 0 | 6 | 0.00 | 4.24 | 0 | 4 | 0 | 0 | 0.059 |
| 2 | 6 | 1.41 | 4.24 | 0 | 2 | −1 | −2 | 7.029 |
| 4 | 6 | 2.83 | 4.24 | 3 | 4 | 0 | 0 | 0.088 |
| 6 | 6 | 4.24 | 4.24 | 2 | 3 | −2 | −1 | 6.574 |

This is not very accurate, but the denominator is small enough the results of all possible (sum, difference) pairs of inputs can be d on a page. For each pair, the sum of the squared error is listed. that except when both inputs are 0, there is some error even if the rounding to integer is used. The average RMSE for rounding pairs to closest integer is $1/\sqrt{2} \approx 0.289$. The 5/7 approximation has four collisions out of 25 possible input pairs. These four collisions increase the RMSE to 0.6529 for this approximation. The columns entitled "rounding offset" are the output of look up tables. For the forward transform, the columns "sum, difference inputs" are the inputs and for the inverse transform, the columns "integer output for reversibility" are the inputs.

The 128/181 approximation given in Table 1 is reasonably accurate. The numerator 128 is a power of 2 which is computationally useful. The determinant is 1.0002 ($\log_2 1.0002 = 0.0003$ bits) so it is very close to efficient. The average RMSE with a good look up table is 0.4434 and the peak error is 1.92.

Forward Computation

A complete forward computation of a rotation for the 2×2 DCT is accomplished as follows. The approximation $1/\sqrt{128/181}$ is assumed for this example. First, in order to compute the forward, the sum and difference of the inputs a and b are computed according to the following equations.

sum=a+b difference=a−b

Next, the sum and difference are divided by 181, saving the remainder, according to the following equations. (Note that 128/181≅181/256 can be used in some implementations to speed up the division.)

ss=sum/181 dd=difference/181 s=sum mod 181 d=difference mod 181

The look up table assumes the pair of modulo 181 values s,d have the same parity (they are either both even or both odd). If ss and dd do not have the same parity, then the parity of one of the modulo values is changed. The change is made so values stay in the range 0 . . . 180. In the pseudo-code below, "^" means exclusive OR. This step is needed for odd denominators, it is not needed for even denominators.

The pseudo code is as follows:
if (ss is odd and dd is even) or (ss is even and dd is odd)
  if (d==180)

$s'=s\^1$ else $d'=d\^1$

The square root of ½ multiplied by s and d can be determined using 128/181 (or 181/256) or a look up table. The rounding offset may be found in the look up table. In one embodiment, the rounding offsets are −1 . . . 1 so the data width of the look up tables can be two bits. The square root of the portion of the inputs represented by ss and dd is 128ss and 128dd respectively, which may be implemented as a shift.

$x = \text{sqrt}(½)*s' + \text{LUT}\_f[s',d'] + 128*ss$ $y = \text{sqrt}(½)*d' + \text{LUT}\_g[s',d'] + 128*dd$ for the equality:

$$\begin{bmatrix} x \\ y \end{bmatrix} = \begin{bmatrix} \frac{1}{\sqrt{2}} & \frac{1}{\sqrt{2}} \\ \frac{1}{\sqrt{2}} & -\frac{1}{\sqrt{2}} \end{bmatrix} \begin{bmatrix} a \\ b \end{bmatrix}$$

Alternatively, the look up table may return both the square root of s (or d) and the rounding offset. In one embodiment, such look up tables have seven bits of data width.

$x = \text{LUT}\_\text{sqrt}½\_f[s',d'] + 128*ss$ $y = \text{LUT}\_\text{sqrt}½\_g[s',d'] + 128*dd$ The values of s and d vary from 0 to 180 but not all pairs occur. In some cases where f and g are dimensional (1D) arrays, indexing a 1D look up table with s+181*d would waste almost half the memory locations. Because 181 is odd, using s'/2+181*d'/2 does not properly handle boundary conditions. The following indexing scheme may be used.

$\text{index} = s'/2 + d'*90 + (d+1)/2$

Figure 12:
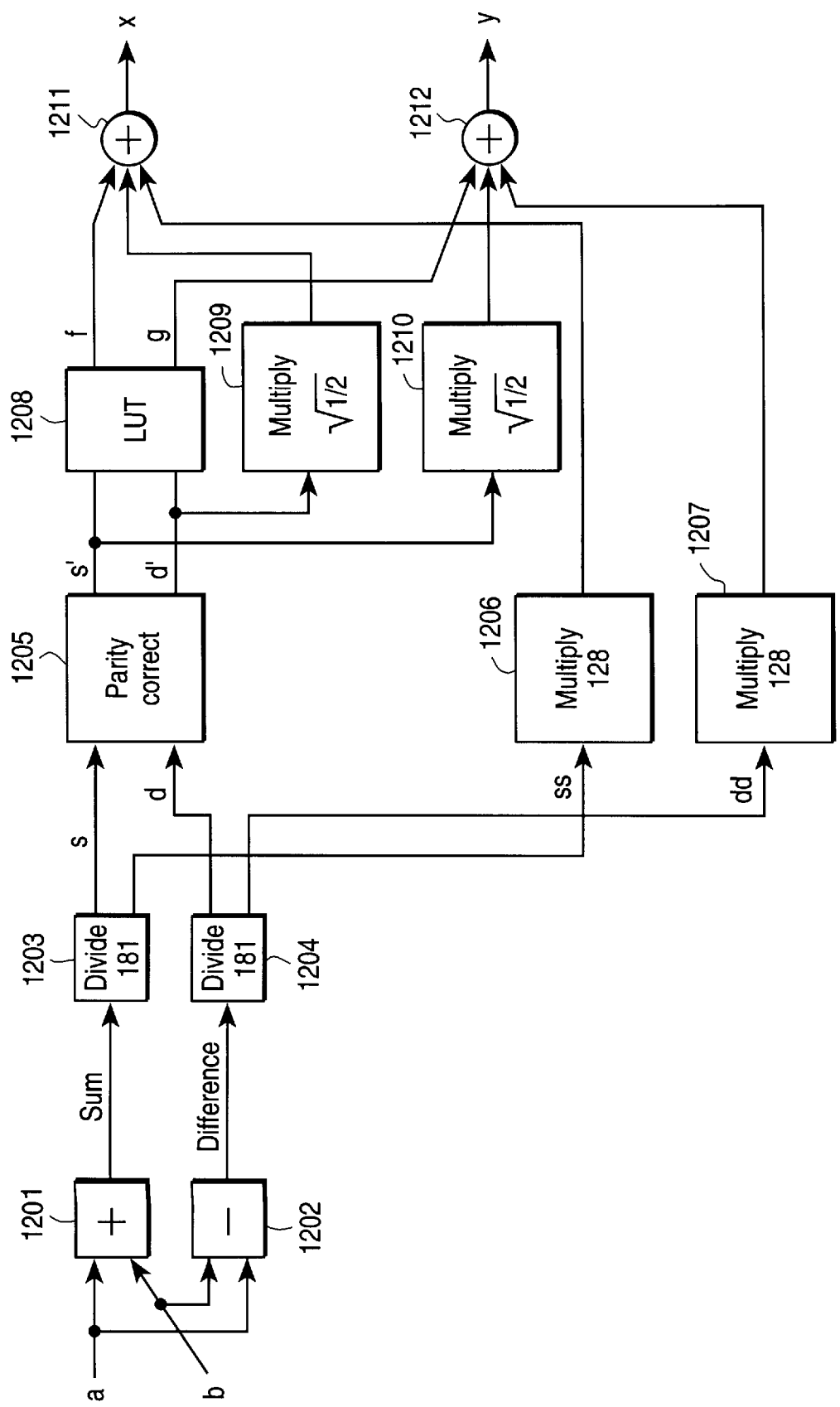
FIG. 12 is a block diagram of one embodiment of a rotation according to the present invention.

FIG. 12 is a block diagram of one embodiment a rotation according to the present invention. Referring to FIG. 12, inputs a and b are added by adder 1201 to produce sum (s), while inputs a and b are input into subtractor 1201 which determines the difference (d) of a−b. The sum (s) is input to divider 1203 which divides it by 183. The remainder output of divider 1203 is coupled to the inputs of parity correction block 1205 and the quotient output is coupled to multiplier 1206. The difference output from subtractor 1202 is input to divider 1204 which divides it by 181 and outputs the remainder result to the other input of parity correction block 1205 and outputs the quotient to the input to multiplier 1207. Parity correction block 1205 performs the parity correction described above and outputs 's and d' which are coupled to two inputs of look-up table (LUT) 1208 and to multipliers 1209 and 1210 respectively.

Multiplier 1206 multiplies the ss output from divider 1203 by 128 and outputs the result to adder 1211. Multiplier 1207 multiplies the output of the dd output of divider 1204 by 128 and outputs the result to adder 1212. Multiplier 1209 multiplies s' by $\sqrt{1/2}$ and outputs the result to adder 1211, while multiplier 1210 multiplies d' by $\sqrt{1/2}$ and outputs the result to adder 1212.

LUT 1208 generates the f and g values as described above and outputs them to adders 1211 and 1212, respectively. Adder 1211 adds the inputs together to produce the x output of the rotation, while adder 1212 adds its inputs to generate the y output.

Inverse Computation

In one embodiment, in order to compute the complete inverse, the approximation of $1/\sqrt{2} \cong 128/181$ is assumed.

First, the inputs x and y are divided by 128, while saving the remainder, according to the following:

$ss = x128$ $dd = y/128$ $i = x \bmod 128$ $j = y \bmod 128$

Next the modulo 128 values are multiplied by the square root of two and the rounding offsets are subtracted. (This can be combined into one LUT.) Because i and j may be any value from 0 to 127, all (or most if there are unused extras) look up table entries may be used without needing a fancy indexing scheme.

$s = \text{sqrt}(2)*i - \text{LUT}\_f\_\text{inverse}[i,j]$ $d = \text{sqrt}(2)*j - \text{LUT}\_g\_\text{inverse}[i,j]$ Afterwards, compensation is made for the case when the ss parity is not the same as the dd parity for odd denominators by using, in one embodiment, the following pseudo code:

if (ss is odd and dd is even) or (ss is even and dd is odd)
  if (d==180)

$s'=s\^1$ else $d'=d\^1$

The sum and difference are computed according to the following equations:

$\text{sum} = s' + 181*ss$ $\text{difference} = d' + 181*dd$

Lastly, the sum and difference are changed back into original values according to the following equations:

$a = \text{sum}/2 + (\text{difference}+1)/2$ $b = \text{sum}/2 - \text{difference}/2$ The inverse may be implemented in a manner similar to that shown in FIG. 12 except the direction is reversed. Such an implementation would be apparent to one skilled in the art in view of FIG. 12.

Creating Look Up Tables for Rounding Offsets

An extra is assigned to every hole. For very small look up tables, exhaustive search can be used to find the best mapping. For larger look up tables, there are several techniques that can be used to successively refine look up tables. The first technique is a deterministic assignment of extras to collisions. In one embodiment, the number of extras is no less than the number of collisions. The extras are spaced out with respect to the collisions to which they are assigned. This technique is fast and allows the process to be replicated at both ends. This technique also avoids having to transmit a look up table as one could be generated on the fly.

for each collision_row
        determine the number of extra_rows needed to provide an extra for every collision in the current collision row.
            if a partial extra row is required, select the proper number of extras evenly spaced within the row
            sort all the extras to be used in column order
            assign extras to collisions in column order The spacing that occurs is based on the number of collisions to extras. By dividing the number of collisions by the number of extras, an index factor is generated. Rounding to the next integer for each provides a set of integers indicative of which collisions to use.

For illustration, consider the pattern of collisions and extras shown in FIG. 9. There are 144 collisions in 12 rows of 12 each. There are 144 extras in 8 rows of 9 each and 9 rows of 8 each. The assignments for the first three rows of collisions are as follows, the remaining rows are assigned in a similar fashion.

12 collisions in first row
    use first extra row which has 8 extras in columns 3, 7, 13, 17, 21, 27, 31, 37
    need 4 extras from second extra row, out of a total of 9, use the ones in columns 4, 14, 24, 34
    The assignments are (extra row, extra column→collision column) 1,3→2; 2,4→6; 1,7→8; 1,13→12; 2,14→16; 1,17→18; 1,21→22; 2,24→26; 1,27→30; 1,31→32; 2,34→36; 1,37→40
    12 collisions in second row
    use remaining 5 extras from second extra row, out of total of 8, use the ones in columns 0, 10, 20, 28, 38
    use 7 extras from the third row, out of a total of 8, use the ones in columns 3, 7, 13, 17, 21, 27, 31
    The assignments are (extra row, extra column→collision column) 2,0→2; 3,3→6; 3,7→8; 2,10→12; 3,13→16; 3,17→18; 2,20→22; 3,21→26; 3,27→30; 2,28→32; 3,31→36; 2,38→440
    12 collisions in third row
    use remaining 1 extra from third extra row, out of a total of 8, use the one in column 37
    use 9 extras from the fourth extra row in columns 0, 4, 10, 14, 20, 24, 28,34,38
    use 2 extras from fifth extra row, out of total of 8, use 3, 21
    The assignments are (extra row, extra column→collision column) 4,0→2; 5,3→6; 4,4→8; 4,10→12; 4,14→16; 4,20→18; 5,21→22; 4,24→26; 4,28→30; 4,34→32; 3,36; 4,40

Given a starting mapping, mappings can be improved by gradient decent (swap extra/collision assignments if mismatch is reduced) or similar optimization procedures (e.g., simulated annealing, etc.).

Another optimization procedure is described in B. Kerninghan, Lin, An Efficient Heuristic Procedure for Partitioning Graphics, Bell Syst. Tech. J., pp. 291–307, 1970. Optimization may be performed considering only collisions and extras or considering all input and output values. Optimization may be performed by swapping pairs of inputs and outputs or by rotating triplets of inputs and outputs. In one embodiment, swaps or rotations that reduce squared error are performed until no more improvements are possible.

The following pseudo code is one embodiment of a high level optimization method. This illustrates a refinement procedure. This method allows for swapping pairs (previous assignments). It allows for swapping an unassigned extra with the extra in an assigned collision-to- extra pair. It allows for swapping where the error does not change, i.e., where the direction of the error is the only issue. A swap that does not change the error is made when it allows a future swap to improve error, that is part of a triple-swap or rotation of three pairs.

for each collision
        compute squared error of current assignment
    do
        for each extra
            initialize extra pair swap to "not swapped yet" (eg. −1)
            initialize extra triple swap "not swapped yet" (eg. −1)
            initialize swap gain to zero
            for k=first swap candidate extra (eg. 0) to last swap candidate extra (eg. number of extras −1)
            try an find a better assignment for extra[k]
            if any better assignments are found
            perform swaps
    while any better assignments are found In order to calculate the squared error, with a rotation by an angle q, the following procedure may be used.

let XC be first coordinate of collision
    let YC be second coordinate of collision
    let XE be first coordinate of extra
    let YE be second coordinate of extra
    let SIN=sin q
    let COS=cos q
    squared error=(COS*XC-round(COS*XE))^2+ (COS*YC-round (COS*YE))^2

The pseudo code for one embodiment of the "try and find a better assignment for extra[k]" routine is as follows:

initialize squared error best_improvement for best swap to zero
    search for best pair swap between extra[k] and extras[n, n>k]
    if best pair swap has same squared error as without swap
        search for best triple swap between extra[k], extra[n] and extras[m,m>n or n>m>k]
        if extra[n] or extra[k] or extra[m] have already been marked
for swapping ignore best triple swap
    if the best swap reduces squared error
        if extra[n] has already been marked for a pair swap
            mark the extra to be swapped with extra[n] as "not swapped yet"

if extra[n] has already been marked for a triple swap
  mark the extras to be swapped with extra[n] as "not swapped yet"
if extra[k] has already been marked for a triple swap
  mark the extras to be swapped with extra[k] as "not swapped yet"
if a triple swap is the best swap and extra[m] has already been
  marked for a triple swap
  mark the extras to be swapped with extra[n] as "not swapped yet"
if a pair swap is the best swap
  mark extra[n] to be swapped with extra[k]
  mark extra[k] to be swapped with extra[n]
else
  mark extra[n] to be triple swapped
  mark extra[k] to be triple swapped
  mark extra[m] to be triple swapped with extra[n] and extra[k]

The pseudo code for one embodiment of the "search for best pair swap" routine is as follows:

for each extra[n]
  calculate swap error=squared error for extra[n], collision[k]+squared error for extra[k],collision[n]
  calculate current error=the sum of squared error for the current assignments of extra[n],extra[k]

The pseudo code for one embodiment of the "perform swaps" routine is as follows:

for each extra[k]
  if extra[k] marked
    n=extra to swap with extra[k]
    if                                           n < k
      swap extra[n] and extra[k]
    calculate squared error of current assignment An Almost Balanced DCT Implementation Look up table based rounding allows implementation of arbitrary 2-point rotations with low mismatch. The present invention allows for creating transforms that are efficient and almost balanced and that can then be implemented reversibly with the look up table technique of the present invention (or some other technique).

A balanced efficient transform exists when the determinant of the transform is a perfect square. An almost balanced transform is created by multiplying all the values in the transform matrix by a constant. The constant is selected such that the determinant can be factored into two close equal factors. Table 3 shows some examples of almost balanced transforms.

TABLE 3

Almost Balanced Transforms

| transform | determinant | multiplier | transform implementation | | balance ratio | LCM |
|---|---|---|---|---|---|---|
| 5,1"A" | 26 | 2 | (10a + 2b)/13 | (2a − 10b)/8 | 13/8 = 1.63 | 52 |
| 5,1"A" | 26 | 3 | (15a + 3b)/18 | (3b − 15a)/13 | 18/13 = 1.38 | 78 |
| 5,1"A" | 26 | 5 | (25a + 5b)/26 | (5a − 25b)/25 | 26/25 = 1.04 | 150 |
| 2,3"C" | 13 | 4 | (8a + 12b)/16 | (12a − 8b)/13 | 16/13 = 1.23 | 52 |
| 2,3"C" | 13 | 30 | (60a + 90b)/117 | (90a − 60b)/100 | 117/100 = 1.17 | 390 |
| 2,3"C" | 13 | 42 | (84a + 126b)/156 | (126a − 82b)/147 | 156/147 = 1.06 | 182 | this_improvement=current error−swap error
if (this_improvement>=0) and (this_improvement>= best_improvement)
  best_improvement=this improvement
  best swap found so far is n The pseudo code for one embodiment of the "search for best triple swap" routine is as follows:

for each extra[n]
  calculate swap error=squared error for extra[m], collision [k]+squared error for extra[n], collision[m]+ squared error for extra[k], collision[n]
  calculate current error=current error−swap error
  if (this_improvement>=0) and (this_improvement>= best_improvement)
  best_improvement=this improvement
  best swap found so far is n The LCM column in Table 3 contains a least common multiple of the denominators, after any common factors in the numerators are removed. A look up table of size $LCM^2$ is sufficient to implement the transform. Large values are broken into a quotient and a remainder after division by the LCD. All of the look up tables required for the transforms in Table 3 are too large to be easily understood examples. The 2,1 almost balanced transform with multiplier 2 is described as an example in the equation below.

$$\begin{bmatrix} 4 & 2 \\ 2 & -4 \end{bmatrix} |\det| = 20 = 5 \times 4$$

The two divisors are 5 and 4, which has balance ratio 1.25. This example requires only a table size of $10^2=100$ and the table has a simple structure.

Table 4 is the look up table for the transform. All except the highlighted squares are determined using the following equation. The highlighted squares indicate collisions assigned to extras.

$$x = \left\lfloor \frac{4a + 2b + 2}{5} \right\rfloor \quad y = \left\lfloor \frac{2a - 4b + 2}{4} \right\rfloor \quad\quad 5$$

TABLE 4

Look Up Table for 2,1 Almost Balanced Transform

| x,y | b = 0 | 1 | 2 | 3 | 4 | 5 | 6 | 7 | 8 | 9 |
|---|---|---|---|---|---|---|---|---|---|---|
| a = 0 | 0,0 | 1,2 | 1,-2 | 1,-3 | 2,-4 | 2,-5 | 2,-6 | 3,-7 | 3,-8 | 3,-9 |
| 1 | 1,1 | 1,0 | 1,-1 | 2,-2 | 2,-3 | 3,-4 | 3,-5 | 3,-6 | 4,-7 | 4,-8 |
| 2 | 2,1 | 2,0 | 2,-1 | 2,-2 | 3,-2 | 3,-3 | 4,-4 | 4,-5 | 5,-7 | 5,-8 |
| 3 | 2,2 | 3,1 | 3,0 | 3,-1 | 4,-2 | 4,-3 | 5,-4 | 5,-5 | 5,-6 | 6,-7 |
| 4 | 3,2 | 4,1 | 4,0 | 4,-1 | 5,-2 | 5,-3 | 6,-4 | 6,-5 | 6,-6 | 7,-7 |
| 5 | 4,3 | 4,2 | 5,1 | 5,0 | 5,-1 | 6,-2 | 6,-3 | 7,-4 | 7,-5 | 7,-6 |
| 6 | 5,3 | 5,2 | 6,1 | 6,0 | 6,-1 | 7,-2 | 7,-3 | 8,-4 | 8,-5 | 8,-6 |
| 7 | 5,4 | 6,3 | 6,2 | 7,1 | 7,0 | 7,-1 | 8,-2 | 8,-3 | 9,-4 | 9,-5 |
| 8 | 6,4 | 7,3 | 7,2 | 8,1 | 8,0 | 8,-1 | 9,-2 | 9,-3 | 10,-4 | 10,-5 |
| 9 | 7,5 | 7,4 | 8,3 | 8,2 | 9,1 | 9,0 | 9,-1 | 10,-2 | 10,-3 | 11,-4 |

Figure 10:
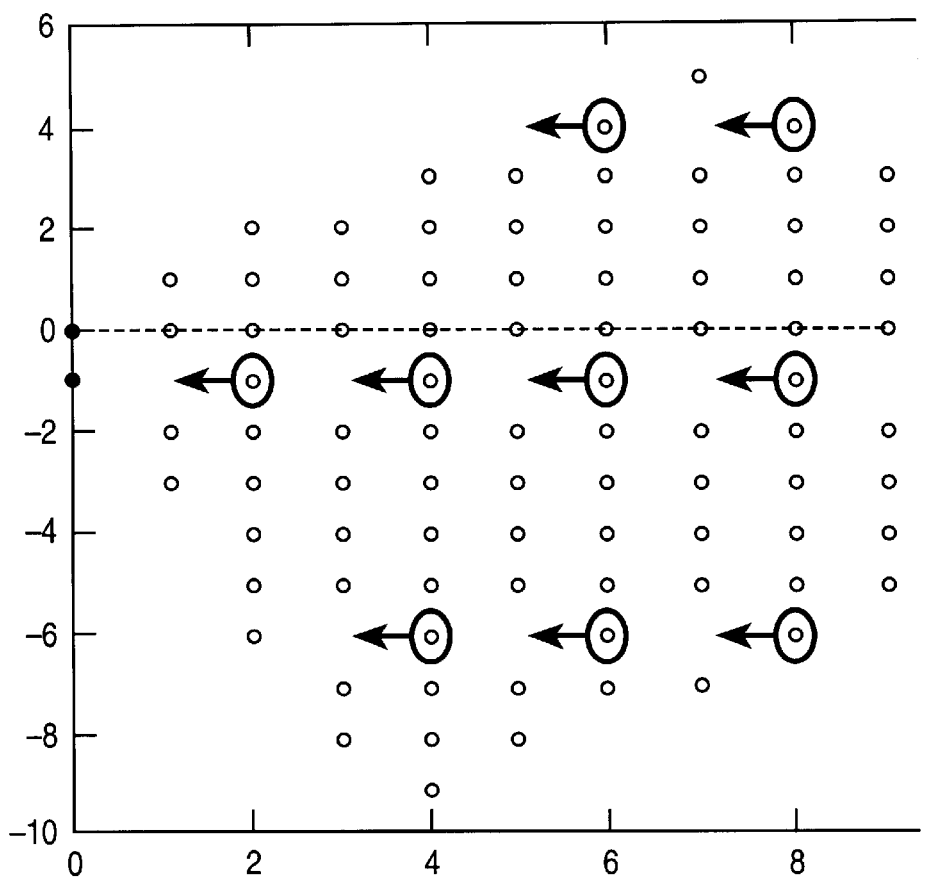
FIG. 10 is a plot of collisions and extras in a 2,1 almost balanced transform.

FIG. 10 is a plot of x,y pairs that occur from the equation above when a and b are in the range 0 . . . 10. The circles and arrows show the mapping of collisions to extras. Appendix A contains one embodiment of source code which implements this transform. It includes both the look up table and the quotient/remainder processing needed to handle arbitrarily large values 8×8 Transforms A variety of the building blocks described above may be used in the various 8×8 reversible APTs, some of which are shown in Table 5. The Chen decomposition of the subsidiary matrix shown in FIG. 3 is used except for the APT labeled Hein which uses the subsidiary matrix shown in FIG. 4. The "efficient" and "efficient" Hein use the building blocks of the reversible implementations described above that do not have internal rounds or look up tables, except for the "1" and "R" in the subsidiary matrix that is done with a look up table. Another APT uses ladder filter building blocks. The "almost efficient" APT is closer to balanced which leads to good lossy performance. The "almost efficient" APT has determinant 1.04 ($\log_2 1.04 = 0.06$ bits of redundancy).

TABLE 5

Building blocks used to create 8 × 8 reversible APTs

| APT parameter | efficient | efficient Hein | efficient Ladder filter | "almost efficient" |
|---|---|---|---|---|
| A | 5,1 transform-unbalanced | 12,5 transform | Ladder | 5,1 transform balanced, inefficient |
| B | 12,5 transform | 12,5 transform | Ladder | 12,5 transform |
| C | 3,2 transform | 3,2 transform | Ladder | 3,2 transform growth in sum |
| 1 (outside subsidiary matrix) | S-transform | S-transform | Ladder | LUT |
| 1 and R (inside subsidiary matrix, before R) | LUT | LUT | Ladder | LUT |

TABLE 5-continued

Building blocks used to create 8 × 8 reversible APTs

| 1 (inside subsidiary matrix, after R) | S-transform | S-transform | Ladder | LUT |

In one embodiment, a finite state machine (FSM) entropy coder and a trivial context model losslessly codes and decodes with the various transforms, such as shown in FIG. 1C. An example of an FSM coder is shown in U.S. Pat. Nos. 5,272,478, 5,363,099 and 5,475,388, each of which is incorporated by reference.

Table 6 shows the growth in the size of coefficients (number of bits) for the 1D 8-point efficient reversible APT.

TABLE 6

Growth in size of coefficients for 8-point efficient reversible APT.

| INPUT | 0 | 1 | 2 | 3 | 4 | 5 | 6 | 7 |
|---|---|---|---|---|---|---|---|---|
| GROWTH | +0 | +0 | +2 | +2 | +1 | +6 | +2 | +5 |

As an example for this transform, if the inputs are 8 bits, the total of 64 bits of input would grow by 18 bits and would result in 82 bits of output. The growth for the 2D 8×8 transform can be determined by applying the 1D results horizontally and vertically. Table 7 shows the growth in the size of coefficients for the 1D 8-point "almost efficient" reversible APT.

TABLE 7

Growth in size of coefficients for 8-point "almost efficient" reversible APT.

| INPUT | 0 | 1 | 2 | 3 | 4 | 5 | 6 | 7 |
|---|---|---|---|---|---|---|---|---|
| GROWTH | +2 | +2 | +2 | +8 | +2 | +1 | +2 | +2 |

As an example for this transform, if the inputs are 8 bits, the total of 64 bits of input would grow by 21 bits and would result in 85 bits of output (when adding the growth from all bits together). Also for example, in the 2-D case where 1D results are applied horizontally and vertically for the horizontal coefficient 2 and vertical coefficient 3, there is an additional 10 bits (as both are added 2+8=10). The good compression results are due to having no redundant least significant bits; the growth is mostly easy to compress more significant bits. To be reversible, an APT must output different coefficients than a floating point DCT, so some mismatch is unavoidable. However, a reversible APT is lossless without quantization. The lossless feature allows for no systemic error is the inverse transform is the inverse reversible APT. If required by an application, reversible APT coefficients could be inverse transformed to the original pixels and then forward transformed with a floating point DCT if exact DCT coefficients were needed. This would again lead to no mismatch.

Tables 8–10 show minimum quantization matrices for various 8×8 APTs. Minimum quantization matrices set forth an amount, or more, of quantization that if applied would result in the reversible APT coefficient differing from true DCT coefficients by no more than ±1. The smaller the minimum quantization values, the less mismatch error in the transform. The DC quantizer is shown in the upper left corner and the AC quantizers are in standard DCT (not zig-zag) order. The "8x8" efficient reversible APT and the ladder filter based APT both have relatively large minimum quantizers for DC and coefficients near DC. These transforms would therefore only approximate the DCT well at low compression/high quality. The "almost efficient" APT has smaller minimum values in general and has much smaller values for DC and near DC. This APT approximates the DCT well at typical JPEG compression ratios.

The "almost efficient" APT has the most mismatch (highest minimum quantizers) in coefficients generated with the "C" APT parameter. A look up table based "C" 2-point rotation might further reduce mismatch.

TABLE 8

Minimum quantization matrix for 8 × 8 efficient reversible APT

| 16 | 25 | 5 | 9 | 7 | 2 | 6 | 2 |
|----|----|---|---|---|---|---|---|
| 11 | 19 | 5 | 8 | 6 | 2 | 4 | 4 |
| 5  | 9  | 2 | 4 | 4 | 1 | 2 | 2 |
| 7  | 11 | 3 | 5 | 4 | 2 | 3 | 2 |
| 7  | 10 | 3 | 5 | 4 | 2 | 3 | 2 |
| 4  | 8  | 2 | 3 | 3 | 1 | 2 | 2 |
| 6  | 9  | 2 | 4 | 4 | 2 | 2 | 2 |
| 6  | 11 | 3 | 4 | 4 | 2 | 3 | 2 |

TABLE 9

Minimum quantization matrix for 8 × 8 efficient reversible APT using ladder filter

| 20 | 11 | 7 | 13 | 7 | 11 | 7 | 15 |
|----|----|---|----|---|----|---|----|
| 6  | 9  | 8 | 9  | 8 | 8  | 8 | 9  |
| 6  | 8  | 6 | 8  | 6 | 6  | 7 | 8  |
| 6  | 8  | 7 | 8  | 7 | 7  | 7 | 8  |
| 6  | 7  | 7 | 8  | 6 | 7  | 7 | 8  |

TABLE 9-continued

Minimum quantization matrix for 8 × 8 efficient reversible APT using ladder filter

| 5 | 7 | 6 | 7 | 6 | 6 | 6 | 7 |
|---|---|---|---|---|---|---|---|
| 6 | 6 | 6 | 7 | 6 | 6 | 6 | 6 |
| 6 | 7 | 6 | 7 | 6 | 6 | 6 | 6 |

The structure of the minimum quantization matrices for some transforms are explained by the structure of the APT scale factor matrices. The ladder filter implementation is an exception, all values in it's scale factor matrix are 1. Tables 11 and 12 show the scale factors for the 8×8 efficient reversible APT and the "almost efficient" version. Large scale factors (greater than 1) result in large minimum quantization values.

TABLE 10

Minimum quantization matrix for 8 × 8 "almost efficient" reversible APT

| 7 | 7 | 6 | 4 | 6 | 13 | 6 | 5 |
|---|---|---|---|---|----|---|---|
| 5 | 6 | 6 | 4 | 6 | 15 | 6 | 5 |
| 5 | 5 | 5 | 4 | 5 | 12 | 5 | 5 |
| 5 | 6 | 5 | 4 | 6 | 13 | 5 | 5 |
| 5 | 6 | 5 | 4 | 6 | 13 | 5 | 5 |
| 6 | 6 | 6 | 4 | 6 | 16 | 6 | 6 |
| 6 | 5 | 5 | 4 | 5 | 10 | 5 | 5 |
| 6 | 5 | 5 | 4 | 6 | 11 | 5 | 5 |

TABLE 11

Scale factors for 8 × 8 efficient reversible APT

| 8.00  | 14.42 | 2.83 | 5.10 | 4.00 | 0.39 | 2.83 | 0.55 |
|-------|-------|------|------|------|------|------|------|
| 14.42 | 26.00 | 5.10 | 9.19 | 7.21 | 0.71 | 5.10 | 1.00 |
| 2.83  | 5.10  | 1.00 | 1.80 | 1.41 | 0.14 | 1.00 | 0.20 |
| 5.10  | 9.19  | 1.80 | 3.25 | 2.55 | 0.25 | 1.80 | 0.35 |
| 4.00  | 7.21  | 1.41 | 2.55 | 2.00 | 0.20 | 1.41 | 0.28 |
| 0.39  | 0.71  | 0.14 | 0.25 | 0.20 | 0.02 | 0.14 | 0.03 |
| 2.83  | 5.10  | 1.00 | 1.80 | 1.41 | 0.14 | 1.00 | 0.20 |
| 0.55  | 1.00  | 0.20 | 0.35 | 0.28 | 0.03 | 0.20 | 0.04 |

TABLE 12

Scale factors for 8 × 8 "almost efficient" reversible APT

| 1.00 | 0.98 | 1.00 | 0.28 | 1.00 | 3.61  | 1.00 | 0.98 |
|------|------|------|------|------|-------|------|------|
| 0.98 | 0.96 | 0.98 | 0.27 | 0.98 | 3.54  | 0.98 | 0.96 |
| 1.00 | 0.98 | 1.00 | 0.28 | 1.00 | 3.61  | 1.00 | 0.98 |
| 0.28 | 0.27 | 0.28 | 0.08 | 0.28 | 1.00  | 0.28 | 0.27 |
| 1.00 | 0.98 | 1.00 | 0.28 | 1.00 | 3.61  | 1.00 | 0.98 |
| 3.61 | 3.54 | 3.61 | 1.00 | 3.61 | 13.00 | 3.61 | 3.54 |
| 1.00 | 0.98 | 1.00 | 0.28 | 1.00 | 3.61  | 1.00 | 0.98 |
| 0.98 | 0.96 | 0.98 | 0.27 | 0.98 | 3.54  | 0.98 | 0.96 |

Lossy Coding

Lossy coding with the reversible APT starts with lossless encoding using the reversible APT. The decoding is lossy and may use a legacy DCT based decompressor such as a JPEG decoder.

Reversible APT coefficients may be used in a lossy compression system such as JPEG in the same manner as regular APT coefficients. A JPEG quantization matrix is chosen. Each quantizer is divided by the corresponding APT scale factor, resulting a new combined quantizer and scale factor. The APT and the combined quantization and scale factor matrix are used as a replacement for the DCT and quantization in JPEG. Any quantization matrix can be used; however, mismatch will occur if the scale factor is larger than the quantizer.

In an alternative embodiment, the quantization division/multiplication is replaced with shifting to select desired bits. This reduces computational cost. It allows an embedded or multi-use system were more bits can be selected for higher quality up to lossless when all bits are selected. The quantizers are chosen such that when they are divided by the corresponding scale factor, they are a power of 2 (or approximately a power of two).

JPEG has a progressive mode called successive approximation. (Although this mode is less well known and less frequently used than the baseline sequential mode of JPEG.) An alignment scheme can be chosen that results in a particular JPEG quantization. This can be used to generate coded data for the first stage of successive approximation which can be very similar to baseline sequential data if spectral selection is not used. Successive approximation allows the remaining data to be coded by bitplanes in an embedded fashion. The progressive JPEG also has spectral selection. Spectral selection allows bitplanes of only specified coefficients to be coded. Spectral selection can be used to specify which coefficients have bits in a bitplane versus coefficients which have already been fully described. If large quantization values were chosen for the first stage, all (or almost) all of the coefficients would be bitplane coded.

If using JPEG progressive mode was not desired, transcoding can be used to create sequential lossless JPEG codestreams of different fidelities. APT coefficients can be coded lossless with some method, not necessarily JPEG compatible. To create a stream, lossless decoding is performed, a desired quantization is performed either by division or shifting. The quantized coefficients can then be coded in a JPEG compatible way. There is a computational savings over lossless coding methods that do not use the reversible APT since no DCT is required during transcoding.

Table 13 shows an example of bits to shift right for each APT coefficient using the "almost efficient" 8×8 reversible APT. This corresponds to a quantizer/scale factor of $2^n$ where n is the number of bits to shift right. Table 14 is the equivalent JPEG DCT quantization matrix that the shifts in Table 13 implement. Table 14 is similar to the psychophysically weighted luminance quantization tables typically used with JPEG.

Tables 15 and 16 show the bits to shift and corresponding quantizers for close to uniform quantization using the "almost efficient" 8×8 reversible APT.

TABLE 13

Bits to shift right for "psychovisual" shift based quantization

| 4 | 4 | 4 | 6 | 4 | 1 | 4 | 4 |
| 4 | 4 | 4 | 6 | 4 | 2 | 5 | 5 |
| 5 | 5 | 4 | 6 | 4 | 4 | 5 | 5 |
| 7 | 7 | 8 | 9 | 8 | 6 | 8 | 8 |
| 6 | 6 | 6 | 8 | 7 | 4 | 6 | 6 |
| 5 | 4 | 4 | 6 | 4 | 8 | 4 | 4 |
| 7 | 7 | 7 | 8 | 7 | 4 | 6 | 7 |
| 7 | 7 | 7 | 9 | 7 | 5 | 7 | 7 |

TABLE 14

Quantization matrix for "psychovisual" shifts

| 16 | 16 | 16 | 18 | 16 | 7 | 16 | 16 |
| 16 | 15 | 16 | 17 | 16 | 14 | 31 | 30 |
| 32 | 31 | 16 | 18 | 16 | 58 | 32 | 31 |
| 36 | 35 | 72 | 41 | 72 | 64 | 72 | 69 |
| 64 | 63 | 64 | 72 | 128 | 58 | 64 | 63 |
| 115 | 57 | 58 | 64 | 58 | 104 | 58 | 57 |
| 128 | 125 | 128 | 72 | 128 | 58 | 64 | 125 |
| 125 | 123 | 125 | 138 | 125 | 113 | 125 | 123 |

Uniform quantization gives the best rate/distortion according to the mean squared error (MSE) metric.

TABLE 15

Bits to shift right for "normalized" shift based quantization

| 4 | 4 | 4 | 6 | 4 | 2 | 4 | 4 |
| 4 | 4 | 4 | 6 | 4 | 2 | 4 | 4 |
| 4 | 4 | 4 | 6 | 4 | 2 | 4 | 4 |
| 6 | 6 | 6 | 8 | 6 | 4 | 6 | 6 |
| 4 | 4 | 4 | 6 | 4 | 2 | 4 | 4 |
| 2 | 2 | 2 | 4 | 2 | 0 | 2 | 2 |
| 4 | 4 | 4 | 6 | 4 | 2 | 4 | 4 |
| 4 | 4 | 4 | 6 | 4 | 2 | 4 | 4 |

TABLE 16

Quantization matrix of "normalized" shifts

| 16 | 16 | 16 | 18 | 16 | 14 | 16 | 16 |
| 16 | 15 | 16 | 17 | 16 | 14 | 16 | 15 |
| 16 | 16 | 16 | 18 | 16 | 14 | 16 | 16 |
| 18 | 17 | 18 | 20 | 18 | 16 | 18 | 17 |
| 16 | 16 | 16 | 18 | 16 | 14 | 16 | 16 |
| 14 | 14 | 14 | 16 | 14 | 13 | 14 | 14 |
| 16 | 16 | 16 | 18 | 16 | 14 | 16 | 16 |
| 16 | 15 | 16 | 17 | 16 | 14 | 16 | 15 |

Implementations Issues

The reversible APT has a higher computation cost than a regular APT because scaling and rounding is performed at each step. To partially compensate for this disadvantage, the register width for the reversible APT is reduced at every step. Small register width and the simple parameters used in calculations aid implementation. In software, multiplication and division operations can be replaced by look up tables. In hardware, dedicated, low-hardware-cost multiply-by-N and divide-by-N circuits can be used.

For example, consider the implementation of part of the "B" 2-point rotation with two lookup tables described below and shown in FIG. 11. In hardware, the two look-up tables could be replaced with dedicated logic.

$$x = \left\lfloor \frac{12a + 5b + 6}{13} \right\rfloor$$

Figure 11:
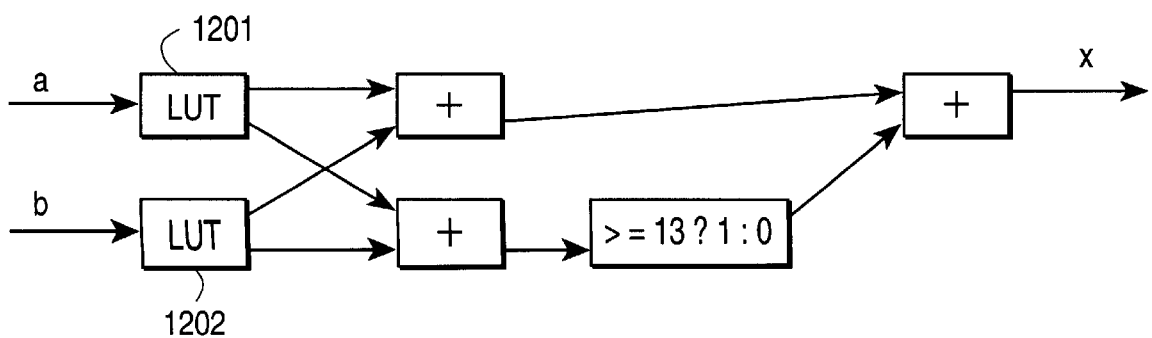
FIG. 11 illustrates one embodiment of a look up table of part of a "B" 2-point rotation.

Referring to FIG. 11, the LUTs 1201 and 1202 operate as follows:

LUT1: given a, returns d1=

$$\left\lfloor \frac{12a}{13} \right\rfloor$$

and r1=(12a)mod 13

LUT2: given b, returns d2=

$$\left\lfloor \frac{5b+6}{13} \right\rfloor$$

and r2=(5b+6)mod 13
This produces the following results:

$x=d1+d2$ when $r1+r2<13$ $x=d1+d2+1$ when $r1+r2\geq 13$

Reversible transforms for unified lossy and lossless compression are extended to include the discrete cosine transform (DCT), the most popular transform for image coded. The reversible Allen Parameterized Transform (APT) implements the DCT as a cascade of "integer rotations," each of which is implemented reversibly. The entropy of reversible APT coefficients was found to similar to the entropy of reversible wavelet coefficients. An "almost balanced" reversible APT sufficiently low mismatch to the floating point DCT so a legacy JPEG decoder can be used for lossy decompression.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a reversible DCT-based system has been described.

Appendix A. Almost balanced 2,1 transform source code

The following "awk" source code implements the almost balanced 2,1 transform using a look up table as described above.

```
#!/usr/bin/nawk -f $0 S*
# Copyright 1996, 1997 RICOH
# integer division followed by "floor" rounding
function mydiv (n,d) {
    m = int(n/d);
    if ((m*d !=n) && (n<0)) {
        return m-1;
    } else
        return m;
}
BEGIN {
    for (a=0;a<10;a++) {
        for (b=0;b<10;b++) {
            x = mydiv(4*a=2*b=2,5);
            y = mydiv(2*a-4b+2,4);
            # fix up boundaries so it tiles correctly
            if ((x== 8) && (y==4))
                x--;
            if ((x==2) && (y==-6))
                x--;
            # match internal collisions and holes
            if (hit[x y] ==1) {
                x1 = x;
                x--;
                if (hit[x y] == 1) {
                    print "ERROR";
                    exit 1;
                }
```

-continued

```
                hit [x y] = 1;
                a1 = lut_a[x1 y];
                b1 = lut_b[x1 y];
                e1 = x1 - ((4.0*a1+2.0*b1) / 5.0);
                e0 = x - ((4.0*a+2.0*b) / 5.0);
                e1s = x - ((4.0*a1+2.0*b1) / 5.0);
                e0s = x1 - ((4.0*a+2.0*b) / 5.0);
                if (e1s*e1s+e0s*e0s < e1*e1+e0*e0) {
                    #swap assignments
                    lut_a[x y] = a1;
                    lut_b[x y] = b1;
                    lut_x[a1 b1] = x;
                    lut_y[a1 b1] = y;
                    lut_a[x1 y] = a;
                    lut_b[x1 y] = b;
                    lut_x[a b] = x1;
                    lut_y[a b] = y;
                }
            } else {
                hit[x y] = 1;
                lut_a[x y] = a;
                lut_b[x y] = b;
                lut_x[a b] = x;
                lut_y[a b] = y;
            }
        }
    }
    # print the mapping
    for (a=0; a<10;a++) {
        for (b=0;b<10;b++) {
            x = lut_x[a b];
            y = lut_y[a b];
            e1 = x - (4.0*a+2.0*b) / 5.0;
            e1 = y - (2.0*a-5.0*b) / 4.0;
            error = e1*e1+e2*e2;
            print x "," y "\t—>" a "," b"\t" error;
        }
        print " ";
    }
    # Check mapping for integers outside of 0..9
    lim = 25;
    for (a=-lim;a<lim+1;a++) {
        ad = mydiv(a,10);
        am = a - ad*10;
        for (b=-lim;b<lim+1;b++0) {
            bd + mydiv(b,10);
            bm = b - bd*10;
            xm + lut_x[am bm];
            ym = lut_y[am bm];
            x = 8*ad + 4*bd + xm;
            y = 5*ad - 10*bd + ym;
            print x ","y"\t—< "a","b;
            if (hit2[x,y] !=" ") {
                print "ERROR: "x","y";"a", "b" & hit2[x,y];
            }
            hit2[x,y] = x ","y";"a","b;
        }
        print " ";
    }
}
```

We claim:

1. A compressor comprising:
   an input;
   a reversible DCT having at least one transform comprising a look up table having a mapping of transform input values to transform output values, and wherein the mapping maps input values from a first group, in which rounding maps inputs to the same transform values, to transform output values that would not have been used with rounding.

2. The compressor defined in claim 1 wherein said at least one transform has a determinant greater than or equal to 1.

* * * * *